US009563339B2

(12) United States Patent
Sakata et al.

(10) Patent No.: US 9,563,339 B2
(45) Date of Patent: Feb. 7, 2017

(54) OPERATION APPARATUS AND IMAGE FORMING APPARATUS HAVING THE SAME

(71) Applicant: Kyocera Document Solutions Inc., Osaka (JP)

(72) Inventors: Hiromi Sakata, Osaka (JP); Koji Maeda, Osaka (JP); Masayuki Tobinaga, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 590 days.

(21) Appl. No.: 13/962,386

(22) Filed: Aug. 8, 2013

(65) Prior Publication Data

US 2013/0326390 A1  Dec. 5, 2013

Related U.S. Application Data

(62) Division of application No. 13/034,826, filed on Feb. 25, 2011.

(30) Foreign Application Priority Data

Mar. 24, 2010 (JP) ................................ 2010-067986
Mar. 26, 2010 (JP) ................................ 2010-072133

(51) Int. Cl.
   *G06F 3/12*      (2006.01)
   *G06F 3/0484*   (2013.01)
   *H04N 1/00*     (2006.01)

(52) U.S. Cl.
   CPC ........ *G06F 3/04842* (2013.01); *H04N 1/0035* (2013.01); *H04N 1/00411* (2013.01); *H04N 1/00416* (2013.01); *H04N 1/00474* (2013.01); *H04N 1/00477* (2013.01)

(58) Field of Classification Search
   None
   See application file for complete search history.

(56) References Cited

U.S. PATENT DOCUMENTS

| 6,078,759 A * | 6/2000 | Satake | ................... G03G 15/50 |
| | | | 358/1.15 |
| 6,744,527 B1 * | 6/2004 | Dorsey | .................. G06K 15/00 |
| | | | 358/1.12 |

(Continued)

FOREIGN PATENT DOCUMENTS

| CN | 101513043 A | 8/2009 |
| CN | 101634931 A | 1/2010 |

(Continued)

OTHER PUBLICATIONS

Iwaya, Akemi, "Move the Progress Bar to the Tabs in Firefox". Nov. 6, 2009, How to Geek.*

(Continued)

*Primary Examiner* — John Wallace
(74) *Attorney, Agent, or Firm* — Knobbe Martens Olson & Bear LLP

(57) ABSTRACT

To provide an operation apparatus and image forming apparatus which can adequately notify users of status information of other apparatuses connected to the operation apparatus. The operation apparatus has: status information acquiring means 503 for acquiring status information of a multi-functional printer 100 associated with a specific tab item from the multi-functional printer 100; status information converting means 508 for converting the acquired status information into tab-type status information; tab item displaying means 510 for displaying tab-type status information in a tab display area which displays the specific tab item and which displays the other associated tab items in a tab display area which displays other tab items other than the specific tab item; and condition screen displaying means 513 for displaying a setting condition screen associated with the specific tab item to be displayed in one screen together with the tab which displays the tab-type status information.

5 Claims, 20 Drawing Sheets

(56) References Cited

U.S. PATENT DOCUMENTS

| | | | |
|---|---|---|---|
| 7,590,947 B1* | 9/2009 | Gay | G06F 3/0483 |
| | | | 715/798 |
| 2004/0138764 A1 | 7/2004 | Kune et al. | |
| 2004/0151291 A1 | 8/2004 | Song | |
| 2005/0195231 A1 | 9/2005 | Kasamatsu | |
| 2008/0024807 A1 | 1/2008 | Matsuda | |
| 2009/0144757 A1* | 6/2009 | Stall | G06F 9/541 |
| | | | 719/320 |
| 2010/0088599 A1 | 4/2010 | Morimoto | |
| 2010/0269139 A1 | 10/2010 | Kim | |

FOREIGN PATENT DOCUMENTS

| | | |
|---|---|---|
| JP | 200478681 A | 3/2004 |
| JP | 2005246827 A | 9/2005 |

OTHER PUBLICATIONS

Patent Abstract of JP2005-246827.
Office Action issued to U.S. Appl. No. 13/034,826 mailed Jan. 27, 2015.
Final Office Action issued to U.S. Appl. No. 13/034,826 mailed Jan. 14, 2014.
Machine Translation of JP2004-078681.
Office Action mailed Jun. 13, 2013 corresponding to Chinese Patent Application No. 201110075358.7.
English Translation of CN 101513043A.
English Translation of CN 101634931A.

* cited by examiner

FIG. 7A

| TAB ITEM | ACQUISITION TARGET ITEMS |
|---|---|
| SIMPLE SETTING | REMAINING TONER INFORMATION |
| FACSIMILE | PAPER JAM INFORMATION OF AUTOMATIC CONVEYING APPARATUS |
| DOCUMENT/ PAPER/FINISHING | REMAINING PAPER INFORMATION |
| COLOR/ IMAGE QUALITY | REMAINING TONER INFORMATION |
| LAYOUT/EDITING | REMAINING TONER INFORMATION |

FIG. 7B

| TAB ITEM | TAB DIMENSION |
|---|---|
| SIMPLE SETTING | 10 mm LONG, 20 mm WIDE |
| FACSIMILE | 10 mm LONG, 20 mm WIDE |
| DOCUMENT/ PAPER/FINISHING | 10 mm LONG, 20 mm WIDE |
| COLOR/ IMAGE QUALITY | 10 mm LONG, 20 mm WIDE |
| LAYOUT/EDITING | 10 mm LONG, 20 mm WIDE |

| TAB ITEM | SETTING CONDITION INFORMATION | | |
| --- | --- | --- | --- |
| | SETTING ITEM | INITIAL SETTING ITEM | ... |
| SIMPLE SETTING (802a) | PAPER SELECTION | AUTOMATIC | ... | ← 801
| | REDUCTION/ ENLARGEMENT | 100% | ... |
| | BOTH SURFACES /DIVISION | ONE SURFACE → ONE SURFAC | ... |
| | SORT/FINISHING | SORT | ... | ← 803a
| | PAGE AGGREGATION | SETTING IS NOT PERFORMED | ... |
| | DENSITY | NORMAL | ... |
| FACSIMILE (802b) | ... | ... | ... |
| DOCUMENT/ PAPER/FINISHING | ... | ... | ... |
| COLOR/ IMAGE QUALITY | ... | ... | ... |
| LAYOUT/EDITING | ... | ... | ... |

802, 803

| FUNCTION ITEM | TAB ITEM | SETTING CONDITION INFORMATION | | |
|---|---|---|---|---|
| | | SETTING ITEM | INITIAL SETTING ITEM | ... |
| COPY | SIMPLE SETTING | PAPER SELECTION | AUTOMATIC | ... |
| | | ... | ... | ... |
| | DOCUMENT/ PAPER/FINISHING | ... | ... | ... |
| | COLOR/IMAGE QUALITY | ... | ... | ... |
| DOCUMENT BOX | CUSTOM BOX | No | – | ... |
| | JOB BOX | ... | ... | ... |
| | REMOVABLE MEMORY | ... | ... | ... |
| | FAX BOX | ... | ... | ... |
| ... | ... | ... | ... | ... |

FIG. 15C

| FUNCTION ITEM | STATUS INFORMATION |
|---|---|
| COPY | REMAINING TONER INFORMATION |
| DOCUMENT BOX | REMAINING MEMORY INFORMATION |
| FACSIMILE | PAPER JAM INFORMATION OF AUTOMATIC DOCUMENT FEEDING APPARATUS |
| ... | ... |

| TAB DISPLAY SCREEN IDENTIFICATION INFORMATION | STATUS INFORMATION | PRESENCE/ABSENCE INFORMATION | |
|---|---|---|---|
| | | SIZE | POSITION INFORMATION |
| ... | | ... | |
| 3 | REMAINING TONER INFORMATION | 40mm×14mm | X(80−120) Y(15−29) |
| 4 | | 20mm×14mm | X(100−120) Y(15−29) |
| ... | | ... | |
| ... | | ... | |
| 4 | REMAINING MEMORY INFORMATION | 20mm×14mm | X(100−120) Y(15−29) |
| 5 | | 0 | |
| ... | ... | ... | |

2804, 2805, 2805a, 2806a, 2806, 2806b, 2806a1, 2804a, 2806b1, 2804b, 2803, 2806a2, 2806b2, 2804c, 2806c

FIG. 19K
| TAB DISPLAY SCREEN IDENTIFICATION INFORMATION | STATUS INFORMATION | PRESENCE/ABSENCE INFORMATION ||
|---|---|---|---|
| | | SIZE | POSITION INFORMATION |
| 5 | REMAINING TONER INFORMATION | ◿ | ▭ |
| 5 | REMAINING TONER INFORMATION | ▯ | ▭ ← AREA DISPLAYING TAB ITEM |
FIG. 19L1
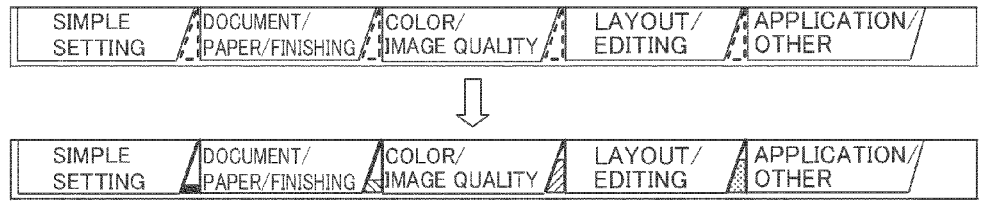
FIG. 19L2
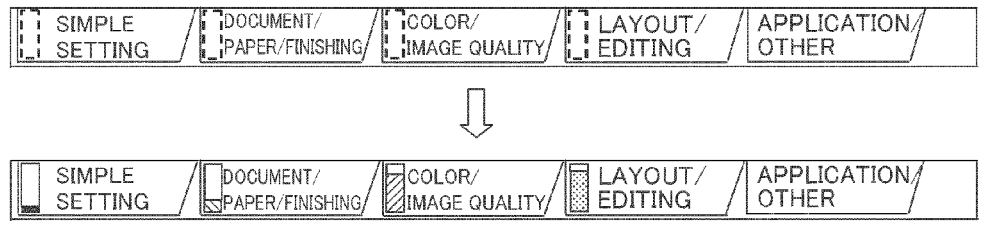

OPERATION APPARATUS AND IMAGE FORMING APPARATUS HAVING THE SAME

CROSS-REFERENCE TO RELATED APPLICATIONS

This application is a divisional of U.S. application Ser. No. 13/034,826, filed Feb. 25, 2011, which claims the benefit of priority from Japanese Patent Application Nos. 2010-067986 and 2010-072133, respectively filed on 24 Mar. 2010 and 26 Mar. 2010, the contents of which are incorporated herein by reference.

BACKGROUND OF THE INVENTION

Field of the Invention

The present invention relates to an operation apparatus and image forming apparatus having this operation apparatus, more particularly, relates to an operation apparatus and image forming apparatus having this operation apparatus which can adequately notify users of status information of other apparatuses connected to the operation apparatus.

Related Art

Conventionally, an operation apparatus and image forming apparatus having this operation apparatus which detects a remaining amount of a printing agent such as toner or ink to display a state where printing is soon to become impossible although printing of images can continue, that is, a near-empty state, on a liquid crystal display (LCD) unit on an operation panel.

This operation apparatus and image forming apparatus display an error message on an LCD and rings a buzzer when it is detected that the remaining amount of ink of any specific color is a near-empty state. By this means, when the remaining amount of ink of any specific color reaches the near-empty state, the operation apparatus and image forming apparatus can notify this state to users around the operation apparatus and image forming apparatus.

In addition, when error transmission mode for transmitting an error including the near-empty state to a specific transmission destination, is set in the operation apparatus and image forming apparatus, the operation apparatus and image forming apparatus transmit contents of this error to the transmission destination such as a manager who manages this image forming apparatus when the error occurs. By this means, the operation apparatus and image forming apparatus can report that the remaining amount of ink of any specific color has reached a near-empty state, to transmission destinations (telephone numbers of, for example, fixed line phones of an outside or fixed contact destination, cellular telephones and pocket beepers, and electronic mail addresses of cellular telephones and personal computers) set in advance in the image forming apparatus, so that it is possible to more reliably broadcast to users that the amount of ink remaining is low.

However, with the above operation apparatus and image forming apparatus, when the near-empty state is detected once, "near-empty" keeps being displayed on the LCD as long as an ink cartridge is not exchanged and the amount of ink remaining does not increase, and information related to the current function such as current mode setting of the image forming apparatus is not displayed on the LCD, and therefore there is a problem that users have difficulty and feel inconvenience in learning the current function.

As a technique for solving this problem, an image printing apparatus which can print images on printing target media using a printing agent, is disclosed which has: detecting means for detecting a remaining printing agent; broadcasting means for broadcasting the detection result of the detecting means; and controlling means for controlling the detecting means and broadcasting means, and in which, when the detecting means detects that the remaining amount of the printing agent is equal to or less than a predetermined amount although printing of images on printing target media can be continued, and the controlling means makes the broadcasting means broadcast for a predetermined period that the remaining amount of the printing agent is equal to or less than a predetermined amount, and then makes the broadcasting means stop broadcasting and broadcast information related to the current function of the image printing apparatus. With this configuration, users can recognize the near-empty state and recognize information related to the current function such as current mode setting of the image printing apparatus.

SUMMARY OF THE INVENTION

However, the above technique stops broadcasting the near-empty state, when a predetermined period passes, and therefore there is a problem that users who use the image printing apparatus after the broadcasting is stopped or users who need to move away from the image printing apparatus for urgent business miss the broadcasted near-empty state.

Further, although the most preferable mode for users is that the image printing apparatus or image forming apparatus displays a remaining amount of a printing agent on a predetermined screen at all times, even if the remaining amount of the printing agent is simply displayed on the screen at all times, whether or not the users recognize the remaining amount of the printing agent is another problem, and therefore it is necessary to make a apparatus in order to adequately notify the users of information which must be broadcasted to the users such as the amount of printing agent remaining.

By contrast with this, multi-functions are equipped in the image printing apparatuses and image forming apparatuses in recent years, and therefore the amount of information to be displayed on one screen has increasing dramatically. As a technique for supporting such a state, a technique is being introduced of preparing a plurality of tabs associated with a specific screen (function), displaying a screen (setting condition screen) associated with the specific tab on a touch panel and displaying a tab dedicated screen (tab display screen) which displays a plurality of tabs selectably. According to this technique, by adding a new tab to the tab display screen, it is possible to display information of a specific screen (function) associated with this tab on one screen, and display various pieces of information (screen) for each function in one screen.

With this technique utilizing tabs, tabs are used for users' operations, and therefore it is known that a display area of these tabs is more likely to catch users' attention than display areas of other screens. Therefore, there is a possibility that predetermined information can be adequately shown to users by correctly utilizing a tab display area.

By contrast with this, when the user selects a specific tab confirming tab items (contents of a setting condition screen associated with a tab) arranged in a tab display area, although a previous setting condition screen is switched to the setting condition screen associated with the tab, the switched setting condition screen and the tab item of the selected tab have the same display contents (meaning), and therefore the actual condition is that both of display contents are less necessary to display. That is, even if the tab item of the selected specific tab is not checked, the display contents of this tab item can be naturally predicted if the user checks the setting condition screen which is displayed at the moment. Therefore, although it is hardly necessary to display a specific tab item associated with the setting condition screen together with the setting condition screen, the actual condition is that the current technique utilizing tabs continues displaying on the display area a specific tab item which is almost meaningless even if the users check it.

Further, the number of tabs to be displayed on the tab display screen occasionally changes depending on user's design, and substantially changes according to the types of specific functions associated with tabs. Therefore, the tab display screen is designed to have a larger display area size (dimensions) in a display area which can display a predetermined number of tabs, such that, even when the number of tabs changes according to a specific function, the changed number of tabs can all be displayed. By this means, even when the number of tabs changes, a technique utilizing tabs can sufficiently display all tabs by preparing a tab display screen having a certain display size.

However, in the above tab display screen, there is a non-tab display area which does not display tabs to support the change of the number of tabs. The non-tab display area size depends on, for example, the tab size and the number of tabs, and therefore is not uniquely determined to a predetermined size. Hence, for example, when the number of tabs is about three, the rate the non-tab display area occupies in the tab display screen becomes great, and the non-tab display area occupies an unnecessary display area in the tab display screen. Accordingly, at the moment, the technique utilizing tabs has a problem that the non-tab display area is not effectively utilized.

Further, although tabs are assigned tab items such as texts showing types of specific functions set in advance, the rate of the display area which displays tab items is about half with respect to the entire display area of the tabs although the rate depends on the types of the tab items, and therefore there is a problem that other display areas which do not display tab items in the tab display area are not effectively utilized.

Hence, the present invention is made to solve the above problem, and it is therefore an object of the present invention to provide an operation apparatus and image forming apparatus having the operation apparatus which can adequately notify users of status information of other apparatuses connected to the operation apparatus by utilizing a tab display area.

Further, it is another object of the present invention to provide an operation apparatus and image forming apparatus having this operation apparatus which can adequately notify users of status information of other apparatuses connected to the operation apparatus by utilizing a non-tab display area in the tab display screen in which the number of tabs changes according to functions.

The operation apparatus according to the present invention employs the following configuration to solve the above problem and achieve the object.

That is, the operation apparatus for displaying on a touch panel a screen including a tab display screen in which a plurality of tabs are aligned and a setting condition screen associated with a tab item displayed in a specific tab, has: status information acquiring means for, when the setting condition screen associated with a specific tab item is displayed, acquiring status information of another apparatus of the operation apparatus from the another apparatus; and status information converting means for converting the acquired status information into tab-type status information which can be displayed in the tab display area. Further, this operation apparatus has: tab item displaying means for displaying the converted tab-type status information in the tab display area which displays the specific tab item in the tab display area, and displaying associated another tab item in a tab display which displays the another tab item other than the specific tab item; and condition screen displaying means for displaying the setting condition screen associated with the specific tab item to be displayed in one screen together with the tab which displays the tab-type status information.

With this configuration, a specific tab item indicating a setting condition screen which has already been displayed is less necessary to be displayed together with the setting condition screen, so that, by replacing the specific tab item with tab-type status information of a apparatus connected to the operation apparatus, it is possible to effectively utilize a tab display area which displays the specific tab item, and notify in advance users of the state (status information) of the apparatus which is to be operated from now. In addition, the tabs are used for users' operations, so that the tab display area is more likely to catch users' attention than other display areas in the screen, and, consequently, it is possible to adequately notify the users of the status information.

Further, the operation apparatus includes: for displaying on a touch panel a screen including a tab display screen which displays a plurality of tabs associated with a specific function which can be executed by another apparatus connected to the operation apparatus and a setting condition screen associated with a specific tab, has: tab item displaying means for, when a tab display screen associated with the specific function is displayed, displaying tab items respectively in a number of tab display areas corresponding to a number of tab items associated with the specific function; and status information acquiring means for acquiring status information of the another apparatus for executing the specific function, from the another apparatus. Furthermore, the operation apparatus has non-tab display area deciding means for deciding whether or not there is a non-tab display area which does not display a tab or a tab item and which can display status information in the tab display screen, based on the status information and tab display screen identification information for identifying a tab display screen which displays a predetermined number of tabs. Still further, the operation apparatus has: status information converting means for, when the non-tab display area is present, converting the status information into tab-type status information which can be displayed in the non-tab display area; and status information displaying means for displaying the converted tab-type status information in the non-tab display area.

With this configuration, by displaying tab-type status information of the apparatus which can execute a function associated with the tab display screen, in the non-tab display area which does not display tabs or tab items, it is possible to effectively utilize the non-tab display area. Further, by displaying the tab-type status information, it is possible to notify in advance users of the state (status information) of the apparatus which is to be operated from now. Furthermore, even if the number of tabs increases or decreases according to a specific function, tab-type status information is displayed when there is a non-tab display area, so that it is possible to effectively utilize the non-tab display area at adequate timings. Still further, the non-tab display area which displays tab-type status information is displayed near tabs without blocking tab display used for panel operations, so that, combined with the characteristics that tabs used for panel operations are more likely to catch users' attention, the tab-type status information is more likely to catch users' attention and, consequently, it is possible to adequately notify of users of status information.

BRIEF DESCRIPTION OF THE DRAWINGS

FIG. 7A is a diagram illustrating an example of an acquisition target table according to Embodiment 1 of the present invention;

FIG. 7B is a diagram illustrating an example of a tab dimension table according to Embodiment 1 of the present invention;

FIG. 15C is a diagram illustrating an example of an acquisition target table according to Embodiment 2 of the present invention;

FIG. 15D is a diagram illustrating an example of a non-tab display area table according to Embodiment 2 of the present invention;

FIG. 19K is a diagram illustrating an example of a non-tab display area table according to a modified example of Embodiment 2 of the present invention;

FIG. 19L1 is a diagram illustrating a first example of a tab display and tabs according to a modified example of Embodiment 2 of the present invention;

FIG. 19L2 is a diagram illustrating a second example of a tab display screen and tabs according to a modified example of Embodiment 2 of the present invention;

DETAILED DESCRIPTION OF THE INVENTION

Hereinafter, embodiments of an image forming apparatus having an operation apparatus according to the present invention will be described for understanding of the present invention referring to the accompanying drawings. In addition, the following embodiments are examples of the embodied present invention, and by no means limit the technical scope of the present invention. Further, alphabet "S" assigned to numbers in the flowchart means steps.

<Image Forming Apparatus and Operation Apparatus>

Hereinafter, embodiments of an image forming apparatus (for example, a multi-functional printer) having an operation apparatus (for example, an operation unit) according to the present invention will be described.

Figure 1:
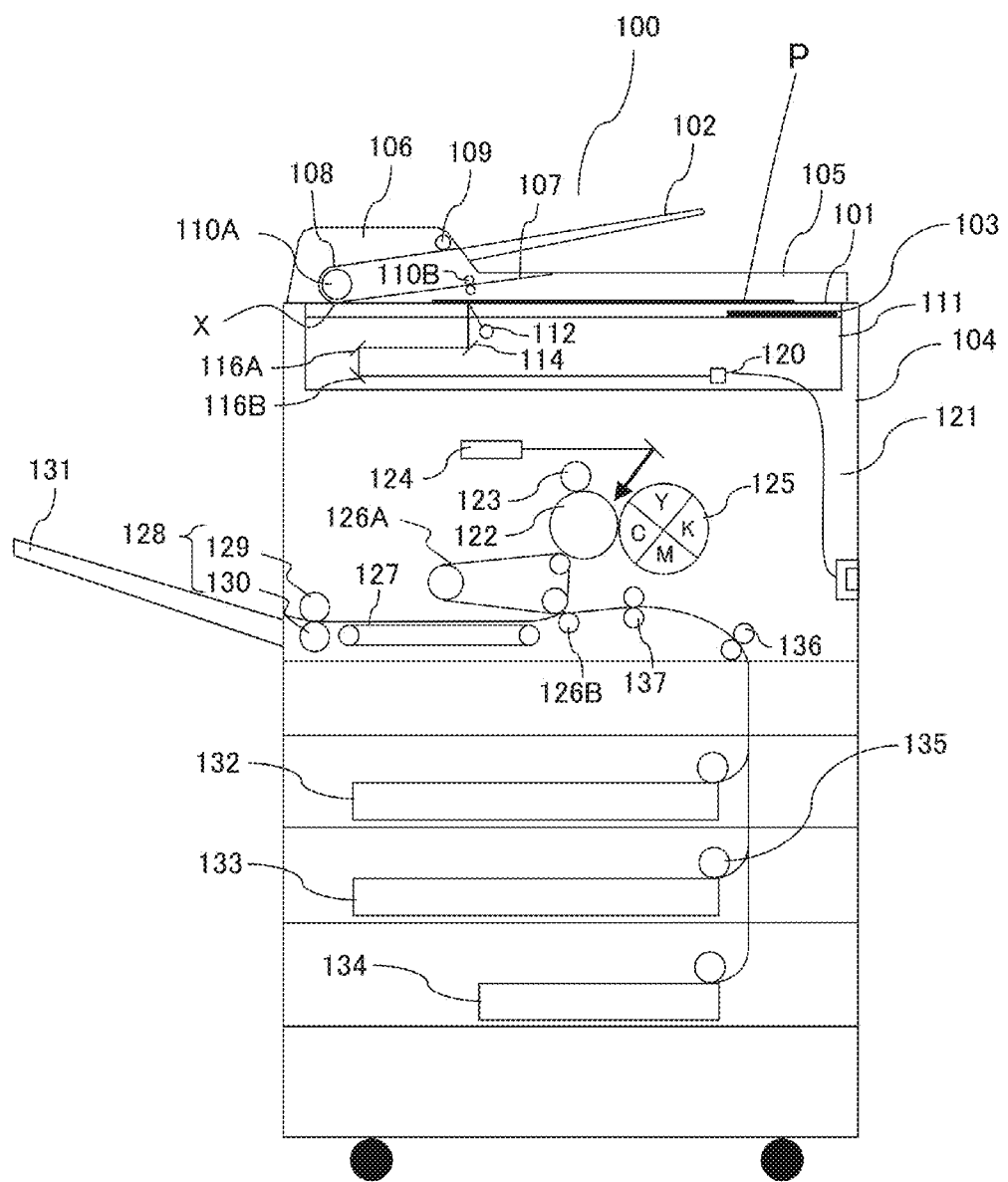
FIG. 1 is a conceptual diagram illustrating an entire configuration inside a multi-functional printer according to an embodiment of the present invention.

FIG. 1 is a conceptual diagram illustrating an entire configuration inside a multi-functional printer according to an embodiment of the present invention. Note that the details of each unit which are not related directly to the present invention will be omitted.

A multi-functional printer 100 according to the present invention corresponds to, for example, a single printer or scanner, or a multi-functional printer having printer, copier, scanner and facsimile functions. In addition, the operation of the multi-functional printer 100 for providing a copying function of document utilizing the multi-functional printer will be briefly described below as an example.

When the user prints, for example, document P utilizing the multi-functional printer 100, the user arranges the document P on a platen 101 or setting table 102 illustrated in FIG. 1, inputs a copy condition in an operation unit 103 provided near the platen 101 and commands printing. The configuration of the operation unit 103 will be described later. When printing is commanded, each unit (driving unit) described below operates to perform printing.

That is, as illustrated in FIG. 1, the multi-functional printer 100 according to the present invention has a body 104 and a platen cover 105 attached above the body 104. The platen 101 is provided on the upper surface of the body 104, and is opened and closed by the platen cover 105. The platen cover 105 is provided with an automatic document feeding apparatus 106, setting table 102 and paper receiving table 107.

The automatic document feeding apparatus 106 is formed with, for example, a document conveying path 108 formed inside the platen cover 105, a pick-up roller 109 provided inside the platen cover 105 and conveying rollers 110A and 110B. The document conveying path 108 extends from the setting table 102 to the paper receiving table 107 via a reading position X where reading is performed by an image reading unit 111 provided in the body 104.

The automatic document feeding apparatus 106 pulls out one of a plurality of sheets of document set on the setting table 102, one by one into the document conveying path 108 by the pick-up roller 109, makes the document pulled out by, for example, the conveying roller pass the reading position X and discharges the document to the paper receiving table 107 by the conveying roller 110B. When passing the reading position X, the document is read by the image reading unit 111.

Figure 2:
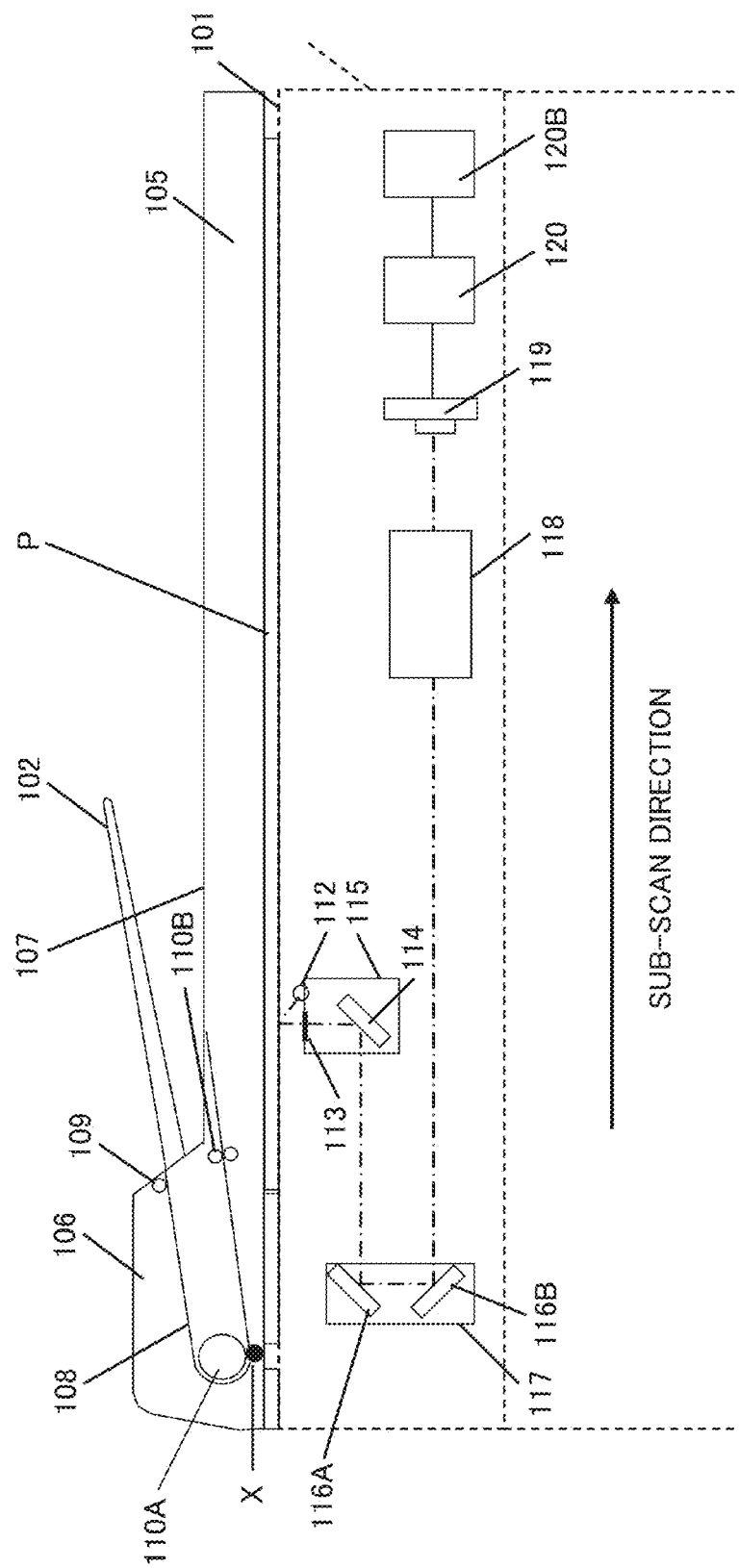
FIG. 2 is an enlarged view of an image reading unit according to an embodiment of the present invention.

The image reading unit 111 is provided below the platen 101, and its details are illustrated in FIG. 2. The image reading unit 111 is formed with a first moving carriage 114 which includes: a light source 112 which is long in a scan direction and which irradiates the platen 101, a slit 113 which selectively allows transmission of light from the platen 101 and a mirror 114 which leads light from the platen 101, a second moving carriage 117 which includes mirrors 116A and 116B which reflect again light reflected from the first moving carriage 115, a lens group 118 which optically corrects light led further by the mirrors, an image capturing element 119 which receives light corrected by the lens group 118, and an image data generating unit 120 which converts light received by the image capturing element 119 into an electrical signal and performs correction processing, image quality processing and compression processing.

When reading document on the automatic document feeding apparatus 106, the light source 112 moves to the position where the light source 112 can irradiate the reading position X, and emits light. Light from the light source 112 transmits through the platen 101 and is reflected on document passing the reading position X, and is led to the image capturing element 119 by the slit 113, mirrors 114, 116A and 116B and lens group 118. The image capturing element 119 converts the received light into an electrical signal, and transmits the signal to the image data generating unit 120. The image data generating unit 120 receives as input the light received by the above image capturing element 119 as analog electrical signals of R (red), G (green) and B (blue), and performs analog to digital conversion of the signals, that is, digitizes the signals. Further, assuming the sequentially converted digital signals as unit data, the image data generating unit 120 generates image data comprised of a plurality of items of unit data by performing correction processing, image quality processing and compression processing of these items of unit data.

Further, the image reading unit 111 can read not only document to be conveyed by the automatic document feeding apparatus 106, but also read document set on the platen 101. When reading document set on the platen 101, the first moving carriage 115 moves in a sub-scan direction while emitting light from the light source 112, and the second moving carriage 117 moves in a direction of the image capturing element 119 at half a speed of the first moving carriage 115 in order to make the optical length from the light source 112 to the image capturing element 119 uniform.

Similar to when document is conveyed to the automatic document feeding apparatus 106, the image capturing element 119 converts light from the document set on the platen 101 based on the light led by the minors 114, 116A and 116B, into an electrical signal, and the image data generating unit 120 generates image data based on this signal and stores the data in a storing unit 120B.

Below the image reading unit 111 of the body 104, an image forming unit 121 which prints image data is provided. Image data which can be printed by the image forming unit 121 is generated by the image data generating unit 120 as described above, or received via a network interface, from a terminal apparatus such as a personal computer connected to another multi-functional printer 100 via a network such as LAN.

The printing system which is performed by the image forming unit 121 adopts the electrophotographic system. The electrophotographic system is a system of uniformly charging a photosensitive drum 122 by a charger 123, then irradiating the photosensitive drum 122 by a laser 124 to form a latent image, fusing toner on the latent image by a developer 125 to form a visible image, and transferring the visible image to a transfer medium by a transfer roller.

In addition, with a multi-functional printer supporting full color image, the above developer (rotary developer) 125 is rotated in a circumferential direction about a rotation axis formed vertically with respect to FIG. 1 such that a developing unit which stores toner of corresponding color is arranged in a position to oppose the photosensitive drum 122. In this state, the latent image on the photosensitive drum 122 is developed by toner stored in the developer 125, and is transferred to an intermediate transferring belt 126A. In addition, the developer 125 has four developing units (Y), (C), (M) and (K) storing each toner of yellow (Y), cyanogen (C), magenta (M) and black (K). By repeatedly transferring the latent image to the above intermediate transferring belt 126A per each color, a full color image is formed on the intermediate transferring belt 126A.

Transfer media on which visible images are printed, that is, sheets are set in a paper feed tray such as paper feed cassettes 132, 133 and 134.

When the image forming unit 121 performs printing, a pick-up roller 135 pulls out one sheet of transfer media from any one of paper feed trays. The transfer medium which is pulled out is sent between the intermediate transferring belt 126A and transferring roller 126B by the conveying roller 136 and resist roller 137.

When transferring a visible image on the intermediate transferring belt 126A to the transfer medium sent between the intermediate transferring belt 126A and transferring belt 126B, the image forming unit 121 sends the transfer medium to a fusing unit 128 (fusing apparatus) by the transferring belt 127 to fuse the visible image. The fusing unit 128 is formed with a heating roller 129 in which a heater is built, and a pressuring roller 130 against which the heating roller 129 is pressed with predetermined pressure. When the transfer medium passes between the heating roller 129 and pressuring roller 130, a visible image is fused on the transfer medium by heat and pressuring force against the transfer medium. The transfer medium on which the image is fused is discharged to the paper receiving tray 131.

According to the above steps, the multi-functional printer 100 provides to users the processing (execution) of a copy function.

Figure 3:
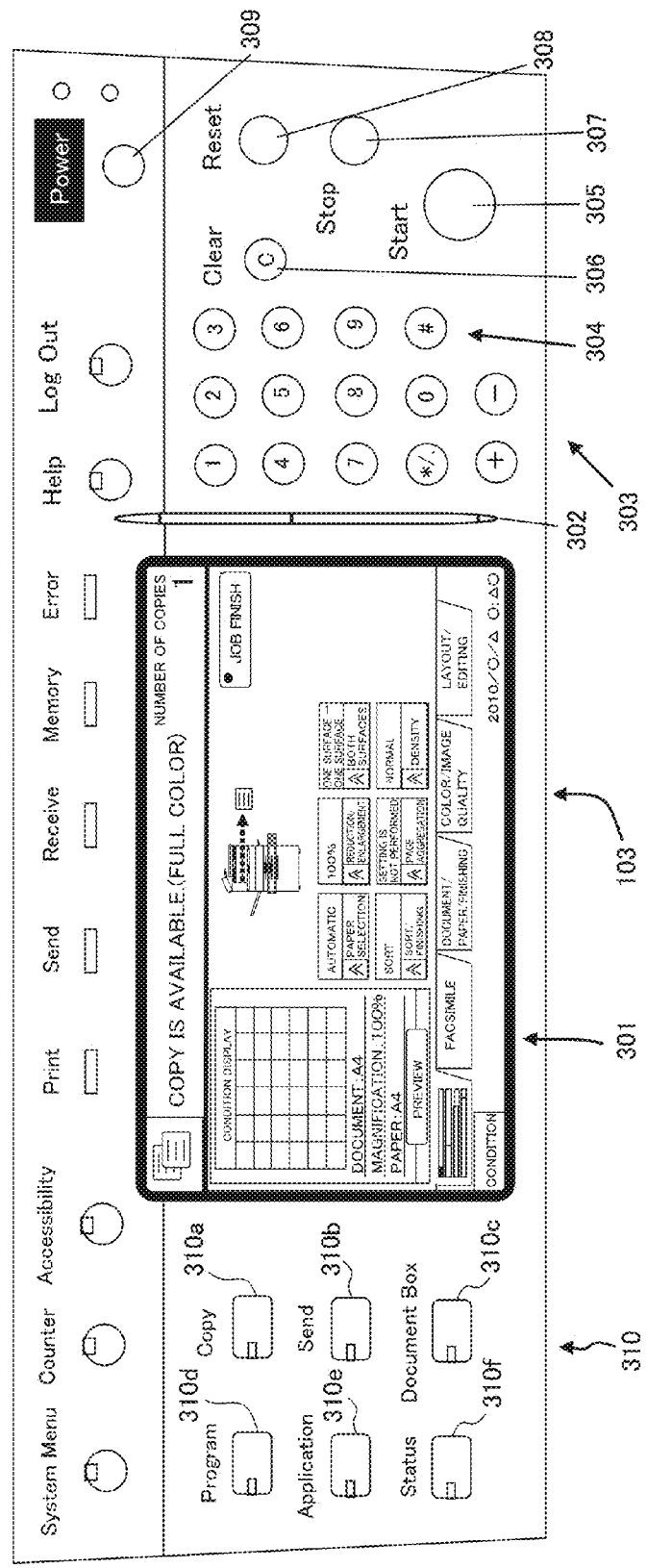
FIG. 3 is a conceptual diagram illustrating an entire configuration of an operation unit according to an embodiment of the present invention.

FIG. 3 is a conceptual diagram illustrating an entire configuration of an operation unit according to an embodiment of the present invention. Using the above operation unit 103, the user inputs, for example, a setting condition for the above image forming, or confirms the inputted setting condition. When the above setting condition is inputted, a touch panel 301 (operation panel), touch pen 302, operation keys 303 and hard keys 310 provided in the above operation unit 103 are used.

The above touch panel 301 adopts, for example, an analog resistive system and employs a configuration where a translucent upper film and lower glass substrate are overlapped via a spacer, and each opposing surface of the upper film and lower glass substrate is provided with a transparent electrode layer formed with ITO (Indium Tin Oxide). Further, when the upper film is pushed down by the user, the transparent electrode layer of the upper film side meeting the pushed-down position and the transparent electrode layer of the lower glass substrate side are configured to contact each other. By applying the voltage to the upper film or lower glass substrate and retrieving a voltage value matching the pushed-down position from the lower glass substrate or upper film, a coordinate value (pushed-down position) matching the voltage value is detected. When the detected pushed-down position is included in a display area of keys such as tabs (keys), setting item keys or, item buttons in a setting screen displayed on the touch panel, for example, a command or signal associated with a tab item of the tab (display command item), setting item and the item are inputted. In addition, in place of the above analog resistive system, the touch panel may be realized by using, for example, a system such as a surface acoustic wave system which is adopted in a technical field related to touch panels.

Further, a display unit such as LCD (Liquid Crystal Display) is provided below the lower glass substrate, and the display unit displays, for example, an initial screen on the screen, so that the screen is displayed on the touch panel 301. The display unit displays screen data set in advance, data of a plurality of setting items described later or a screen and image matching data of a tab item in a tab. By this means, the touch panel 301 is equipped with a function of inputting a predetermined command or setting condition and a function of displaying the command or setting condition.

Further, the touch pen 302 is provided near the touch panel 301, and, when the user makes the tip of the touch pen 302 contact the touch panel 301, the coordinate value matching the contact position (pushed-down position) is outputted as described above, so that the user can push down and select a displayed tab (key), setting item key or item key using the touch pen 302.

Furthermore, a predetermined number of operations keys 303 are provided near the right side of the touch panel 301, and, for example, a numerical key pad 304, start key 305, clear key 306, stop key 307, reset key 308 and power key 309 are provided.

Still further, a predetermined number of hard keys 310 are provided near the left side of the touch panel 301. The hard keys 310 are associated with each of a plurality of functions provided in the multi-functional printer 100, and are provided with, for example, a "Copy" key 310a, "Send" key 310b, "Document Box" key 310c, "Program" key 310d, "Application" key 310e and "Status" key 310f.

Figure 4:
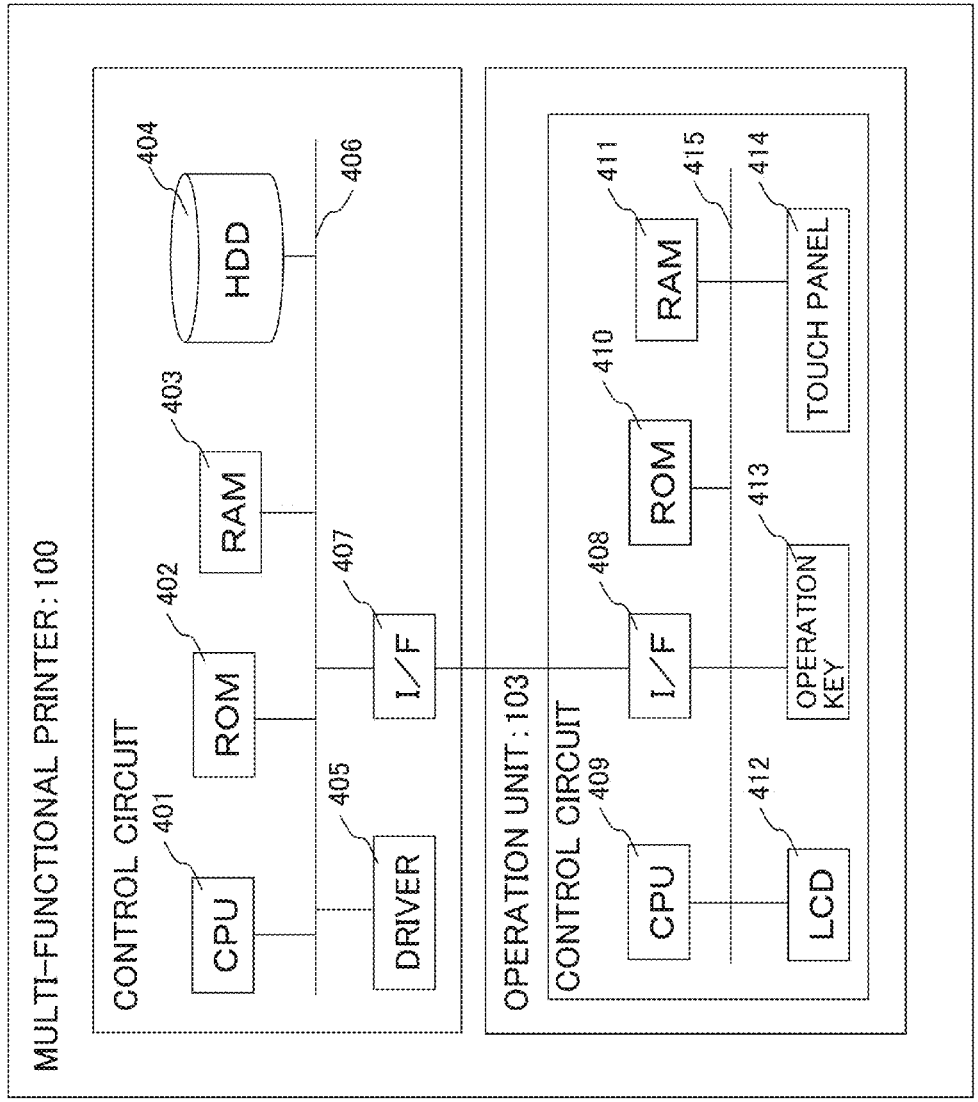
FIG. 4 is a diagram illustrating a control hardware configuration of a multi-functional printer and operation unit according to an embodiment of the present invention.

Next, a control hardware configuration of the multi-functional printer 100 and operation unit 103 will be described using FIG. 4. FIG. 4 is a diagram illustrating a control hardware configuration of the multi-functional printer and operation unit according to an embodiment of the present invention. However, the details of each unit which are not related directly to the present invention will be omitted.

The control circuit of the multi-functional printer 100 connects CPU (Central Processing Unit) 401, ROM (Read Only Memory) 402, RAM (Random Access Memory) 403, HDD (Hard Disk Drive) 404 and a driver 405 corresponding to each driving unit via an internal bus 406. The above CPU 401 utilizes, for example, the RAM 403 as a working area, executes programs stored in the above ROM 402 and HDD 404, receives data or commands from the above driver 405 and operation unit 103 that is not illustrated, based on the execution result, and controls the operation of each driving unit illustrated in above FIG. 1. Further, as for each means (illustrated in FIG. 5) other than the above driving units which is described later, the above CPU 401 realizes each means by executing the program.

Furthermore, an internal interface 407 is also connected to the internal bus 406 of the control circuit, and the internal interface 407 connects, for example, the control circuit of the operation unit 103 and the control circuit of the multi-functional printer 100. The CPU 401 receives a command signal from the control circuit of, for example, the operation unit 103 via the internal interface 407, and transmits, for example, command signals and data to the control circuit of, for example, the operation unit 103.

Further, the control circuit of the operation unit 103 has the CPU 409, ROM 410, RAM 411, LCD 412, operation key 413 (303), touch panel 414 (301) and internal interface 408 in an internal bus 415. When the user operates the operation key 413 or touch panel 414, the CPU 409 transmits a command signal based on this operation to the control circuit of the multi-functional printer 100 via the internal interface 408. Further, the functions of the CPU 409, ROM 410 and RAM 411 are the same as above, and the above CPU 409 executes each means (illustrated in FIG. 5) which will be described later by executing the program. The above ROM 410 stores programs and data for realizing each means which will be described below.

Embodiment 1 of the Present Invention

Figure 5:
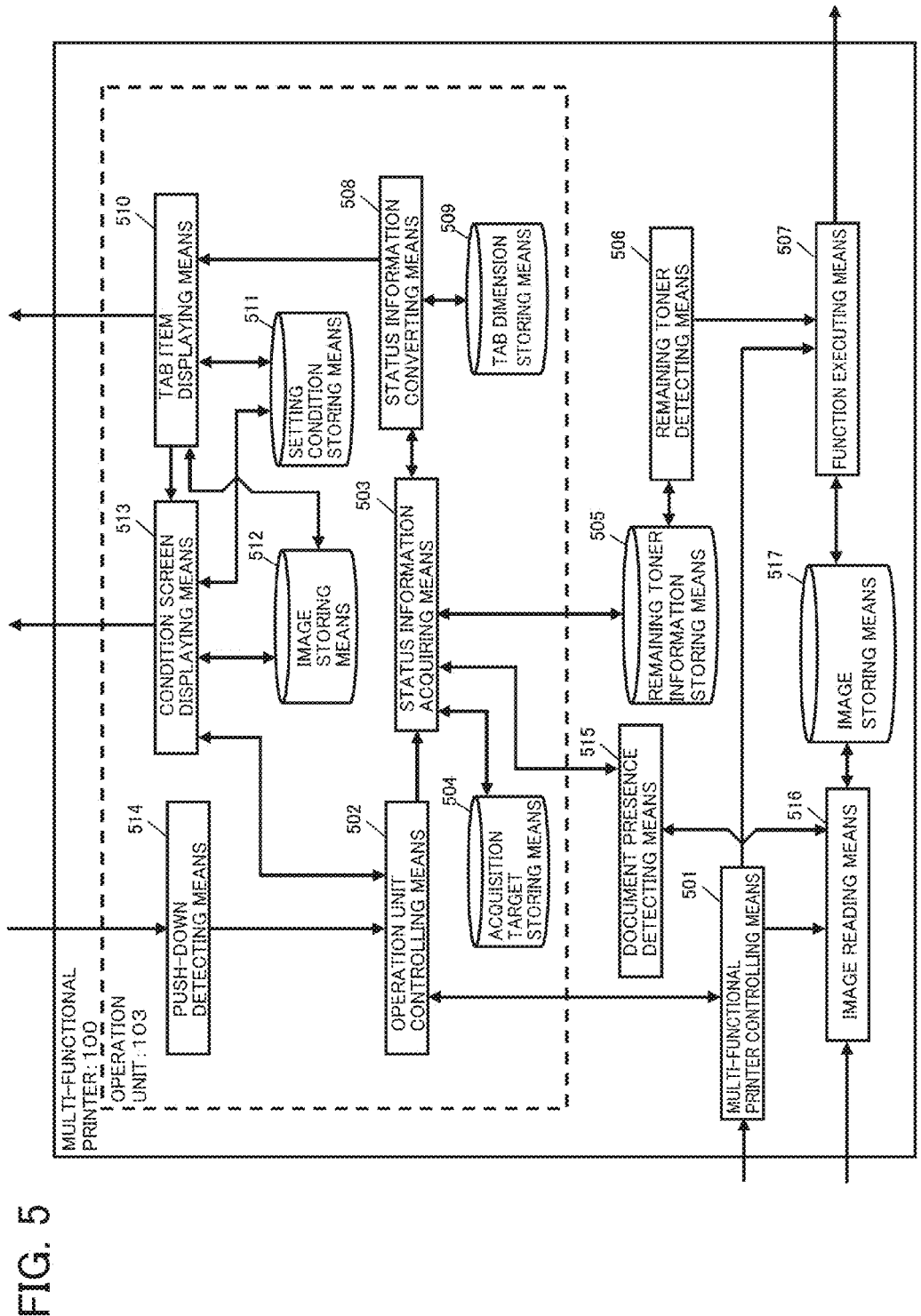
FIG. 5 is a functional block diagram of an operation unit and multi-functional printer according to Embodiment 1 of the present invention.
Figure 6:
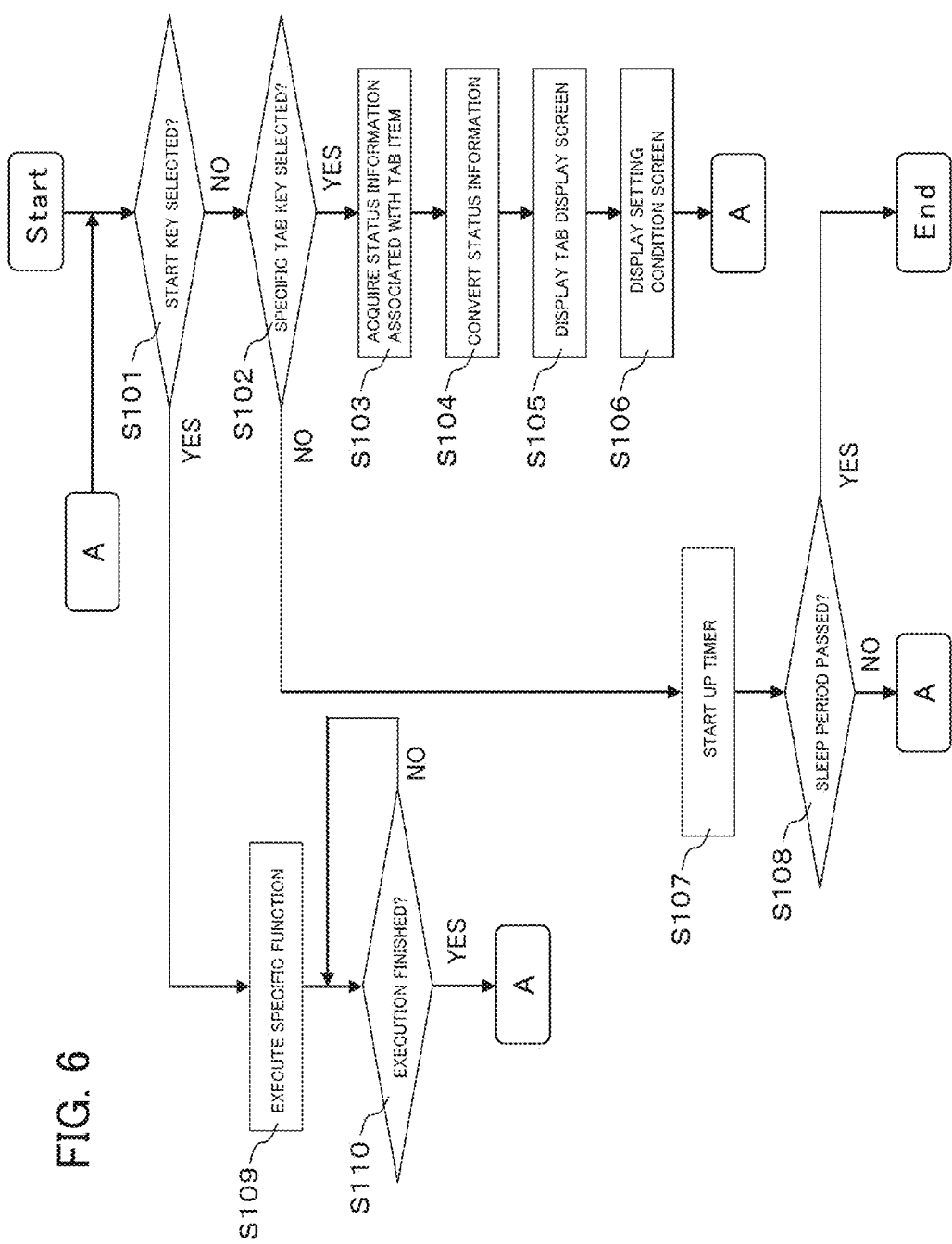
FIG. 6 is a flowchart illustrating execution steps according to Embodiment 1 of the present invention.

FIG. 5 is a functional block diagram of the operation unit and multi-functional printer according to Embodiment 1 of the present invention. FIG. 6 is a flowchart illustrating execution steps according to Embodiment 1 of the present invention. The configuration and execution steps of the present invention will be described in detail below.

First, when the user powers on the multi-functional printer 100, multi-functional printer controlling means 501 of the multi-functional printer 100 and operation unit controlling means 502 of the operation unit 103 connected to the multi-functional printer controlling means 501 start up. The multi-functional printer controlling means 501 commands the operation unit controlling means 502 to display on the touch panel 301 a copy setting screen which is an initial setting screen (default setting screen) set in advance by the user and which is associated with a tab item (for example, "simple setting") showing the name of the copy function. Here, the tab item is set in advance for each of a plurality of functions provided in the multi-functional printer 100, and shows the name of a specific function.

The operation unit controlling means 502 decides that the user has not yet selected (pushed down) the start key (FIG. 6: S101 NO), and, assuming that the specific tab item "simple setting" is selected according to the command from the multi-functional printer controlling means 501 (similar to when the user selects the tab of the tab item "simple setting") (FIG. 6: S102 YES), commands status information acquiring means 503 to acquire status information of the multi-functional printer 100 which executes a copy function indicated in the specific tab item "simple setting." The status information acquiring means 503 having received this command acquires status information associated with the specific tab item "simple setting," from the multi-functional printer 100 (FIG. 6: S103).

Here, the status information shows the state of the multi-functional printer 100. The status information includes: for example, remaining toner information of each color which is used when the multi-functional printer 100 executes the copy function; remaining paper information of each size; error information showing an error (inconvenience) which has occurred in the multi-functional printer 100; paper jam information (JAM information) showing that paper is jamming in a document conveying path or conveying path of a copy target paper in the automatic document feeding apparatus; and non-attachment information showing that the paper feed cassette is not yet attached to a predetermined attachment portion.

Although the method of the status information acquiring means 503 to acquire status information associated with the specific tab item "simple setting" from the multi-functional printer 100 may be any method, the method is performed according to, for example, the following method. That is, the status information acquiring means 503 having received the command refers to the acquisition target table stored in advance in acquisition target storing means 504.

FIG. 7A is a diagram illustrating an example of the acquisition target table according to Embodiment 1 of the present invention.

As illustrated in FIG. 7A, the acquisition target table 700 stores in association tab items 701 (for example, "simple setting" 701a) and acquisition target items 702 (for example "remaining toner information" 702a) associated with the tab items. Here, when the multi-functional printer 100 executes the function indicated by a tab item, the acquisition target item 702 indicates the acquisition target (type and acquisition destination) of status information associated with this function. For example, if the tab item 701 is "simple setting" 701a associated with the copy function, the acquisition target item 702 stores in association "remaining toner information" 702a associated with the copy function. Further, for example, if the tab item 701 is "facsimile" 701b associated with the facsimile transmitting/receiving function, the acquisition target item 702 stores in association "paper jam information of automatic document feeding apparatus" 702b associated with the facsimile transmitting/receiving function. In addition, although, with Embodiment 1 of the present invention, as illustrated in FIG. 7A, the acquisition target item 702 associated with the function indicated by the tab item 701 is stored, specific acquisition target items 702 (for example "remaining toner information" 702a) may be stored uniformly in association with the tab item 701. The users, for example, adequately change the design of the acquisition target table 700.

The status information acquiring means 503 cross-checks the specific tab item "simple setting" and the tab items 701 of the acquisition target table 700, and acquires acquisition target information "remaining toner information" 702a associated with the cross-checked tab item "simple setting" 701a. Next, the status information acquiring means 503 communicates with the multi-functional printer 100, refers to remaining toner information storing means 505 which stores remaining toner information associated with the acquired "remaining toner information" 702a, and acquires remaining toner information of each color (for example, black (K) 10%, syanogen (C) 35%, yellow (Y) 80% and magenta (M) 90%) from the remaining toner information storing means 505.

The remaining toner information of each color stored in the remaining toner information storing means 505 is occasionally stored (updated) in the remaining toner information storing means 505 every time, for example, function executing means 507 executes color printing using remaining toner detecting means 506 which detects remaining toner information of each color.

When finishing acquiring remaining toner information of each color, the status information acquiring means 503 notifies status information converting means 508 of this. The status information converting means 508 having received the notice converts the remaining toner information of each color into tab-type status information which can be displayed in a tab display area which displays the specific tab item "simple setting" 701a (FIG. 6: S104).

Although a method of the status information converting means 508 to convert remaining toner information of each color into tab-type status information may be any method, the method is performed according to, for example, the following method. That is, the status information converting means 508 having received the notice acquires the specific tab item "simple setting" 701a from the status information acquiring means 503, and refers to a tab dimension table stored in advance in tab dimension storing means 509.

FIG. 7B is a diagram illustrating an example of a tab dimension table according to Embodiment 1 of the present invention.

As illustrated in FIG. 7B, the tab dimension table 703 stores in association tab items 704 (for example, "simple setting" 704a) and dimensions 705 of the tab display area (tab area, tab size and tab dimensions, for example, 10 mm long and 20 mm wide) which displays the tab items 704 in the tab display screen. In addition, although, with Embodiment 1 of the present invention, as illustrated in FIG. 7B, the same tab dimensions 705 ("10 mm long and 20 mm wide") are stored for all tab items 704, there are cases where different tab dimensions are stored per tab item according to the tab display screen dimensions and the number of tabs. Further, although the tab dimensions are displayed as lengths for ease of understanding of the present invention, pixel display and the like may be possible.

The status information converting means 508 cross-checks the acquired tab item "simple setting" 701a and the tab items 704 of the tab dimension table 703, and acquires the tab dimensions "10 mm long and 20 mm wide" 705a associated with the cross-checked tab item "simple setting" 704*a*. When acquiring the tab dimensions, the status information converting means 508 converts remaining toner information of each color acquired in the status information acquiring means 503, into tab-type status information.

Figures 8C, 8D:
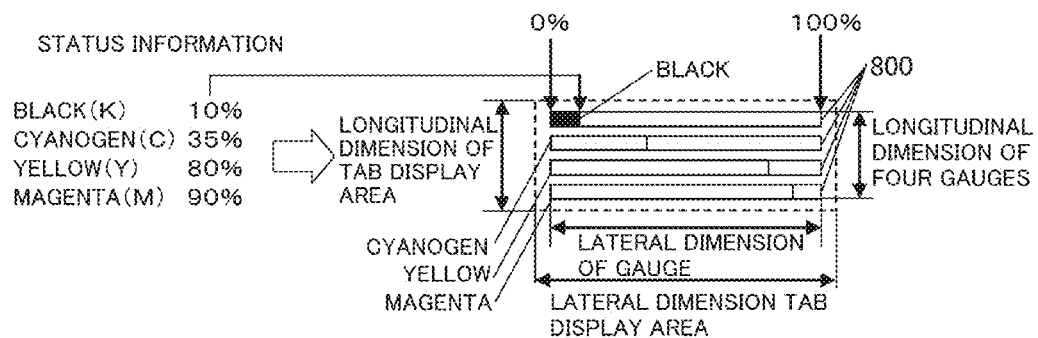
FIG. 8C is a diagram illustrating an example where remaining toner information of each color is converted into tab-type status information according to Embodiment 1 of the present invention.
FIG. 8D is a diagram illustrating an example of a setting condition table according to Embodiment 1 of the present invention.

FIG. 8C is a diagram illustrating an example where remaining toner information of each color is converted into tab-type status information according to Embodiment 1 of the present invention.

Although the converting method varies according to the type of status information, if, for example, status information is remaining toner information of each color, the status information converting means 508 converts (defines as a graphic) the remaining toner information of each color into a gauge of each color (four gauges) which displays remaining toner information, as a graphic image according to the tab dimensions "10 mm long and 20 mm wide" 705*a*. More specifically, the status information converting means 508 generates four gauges 800 having the dimension of 18 mm wide which is a predetermined dimension (for example 2 mm) shorter than the tab dimension of 20 mm wide, and aligns the generated four gauges at equal intervals (for example, 1 mm) and in parallel in a vertical direction (up and down directions). Next, the status information converting means 508 adjusts the longitudinal dimension of each gauge to a predetermined longitudinal dimension (for example, 1.5 mm) such that the gauge of the uppermost part and the gauge of the lowermost part of the aligned four gauges 800 (the longitudinal dimension of the entire graphic image formed with the four gauges 800 is, for example, 9 mm in FIG. 8C) becomes shorter a predetermined dimension (for example, 1 mm) than the tab dimension of 10 mm long. Then, the status information converting means 508 assigns remaining toner information of each color "black (K) 10%, cyanogen (C) 35%, yellow (Y) 80% and magenta (M) 90%" to the four gauges 800 having the adjusted longitudinal dimension.

For example, when remaining toner information of black (K) is assigned to one gauge, the status information converting means 508 specifies a remaining amount position associated with remaining toner information of black (K) "10%" assuming that the left end part of the gauge is "0%" and the right end part of the gauge is "100%." When the lateral dimension of the gauge is, for example, 18 mm, the position from the left end part "0%" (0 mm) to 0.10×18 mm=1.8 mm is the remaining toner position of black (K). Next, the status information converting means 508 marks the left end part of the gauge to the remaining toner position with black (K) matching a color of toner. By this means, remaining toner information of black (K) is assigned to one gauge. In addition, the same applies to cyanogen (C), yellow (Y) and magenta (M). When the status information converting means 508 assigns remaining toner information of each color to all gauges 800, the assigned four gauges 800 become graphic images in which colors are aligned in parallel in order of black (K), cyanogen (C), yellow (Y) and magenta (M) from the top to the bottom and show remaining toner of each color. Thus, when remaining toner information of each color (status information) is configured to be converted (defined as a graphic) into the four gauges 800 (tab-type status information) which are graphic images not including texts, the user can recognize (confirm) remaining toner of each color (status information) immediately by checking the graphic images once, and this is preferable.

When finishing conversion to tab-type status information, the status information converting means 508 notifies the tab item displaying means 510 of this. The tab item displaying means 510 having received the notice displays the converted tab-type status information (four gauges 800) in the tab display area which displays the specific tab item "simple setting" 701*a* in the tab display screen, and displays the other associated tab items in the tab display area which displays tab items (for example, "facsimile 701*b*") other than the specific tab item "simple setting" 701*a* (FIG. 6: S105).

Although the method of the tab item displaying means 510 to display the tab-type status information and other tab items in associated tab display areas may be any method, the method is performed according to, for example, the following method. That is, the tab item displaying means 510 refers to the setting condition table stored in advance in the setting condition storing means 511.

FIG. 8D is a diagram illustrating an example of the setting condition table according to Embodiment 1 of the present invention.

As illustrated in FIG. 8D, the setting condition table 801 stores in association tab items 802 (for example, "simple setting" 802*a*) and setting condition information 803 (for example, setting item and initial setting item) associated with the tab items 802.

The tab item displaying means 510 sequentially acquires all tab items 802 (for example, "simple setting" 802*a*) from the upper most stage of the setting condition table 801. Next, the tab item displaying means 510 refers to the image storing means 512 and acquires the tab display screen (tab display frame) stored in advance in the image storing means 512.

Figure 9E:
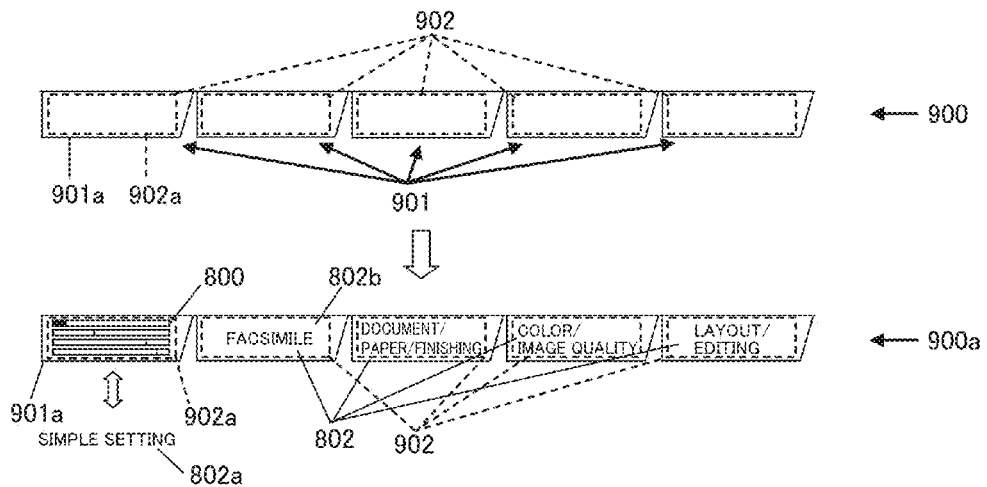
FIG. 9E is a diagram illustrating an example of a tab display screen according to Embodiment 1 of the present invention.

FIG. 9E is a diagram illustrating an example of a tab display screen according to Embodiment 1 of the present invention.

As illustrated in FIG. 9E, a predetermined number (five) of virtually rectangular tabs 901 which are long in left and right directions (horizontal direction) are aligned in series along the horizontal direction without overlapping each other.

Here, the tab items displayed in the display areas 902 of the tabs 901 and the tab item 802 of the setting condition table 801 are associated. For example, the number of tabs 901 displayed in the tab display screen 900 is associated with the number (five) of tab items 802 stored in the setting condition table 801. Further, the tab item displayed (arranged) in the display area 902*a* of the tab 901*a* positioned at the left end of the tab display screen 900 is associated with the tab item "simple setting" 802*a* stored in the uppermost stage of setting condition table 801. In addition, the association between the tab items displayed in the display areas 902 of the tabs 901 and the tab items 802 of the setting condition table 801 in the tab display screen 900 is made by, for example, associating the orders of tabs 901 (display areas 902 of tabs 901) aligned in the right direction based on the tab 901*a* positioned at the left end of the tab display screen 900 and the order of the tab items 802 aligned below based on the uppermost stage of the tab items 802 of the setting condition table 801.

Further, the dimensions of the display areas 902 of the tabs 901 in the tab display screen 900 and the tab dimensions 705 of the tab dimension table 703 are associated. For example, the dimensions of the display area 902*a* of the tab 901*a* positioned at the left end of the tab display screen 900 are associated with the tab dimensions "10 mm long and 20 mm wide" in the uppermost stage stored in the tab dimension table 703 (that is, the tab dimensions associated with "simple setting" 704*a*).

Further, at a time when the tab item displaying means 510 acquires the tab display screen 900, information such as tab items is not yet displayed (arranged) in the display areas 902 of the tabs 901 in the tab display screen 900. Therefore, the tab item displaying means 510 which acquires the tab display screen 900 arranges (pastes) the tab items 802 acquired from the setting condition table 801 respectively in the display areas 902 of the associated tabs 901, based on the order of the tab items 802 stored in the setting condition table 801 and the arrangement order of the tabs 901 arranged in the tab display screen 900.

Here, when the tab item 802 is arranged in the display area 902 of the associated tab 901, if the tab item displaying means 510 arranges the specific tab item "simple setting" 802a (701a) in the display area 902 of the associated tab 901 (display area 902a of the tab 901a positioned at the left end), tab-type status information (four gauges 800) is arranged in the display area 902a of the tab 901a. By this means, the specific tab item "simple setting" 802a is replaced with tab-type status information (four gauges 800). In addition, the other tab items 802 (for example, "facsimile" 802b) other than the specific tab item "simple setting" 802a are arranged in the display areas 902 of the associated tabs 901 according to the order the other tab items are stored in setting condition table 801.

When arranging the tab-type status information 800 and other tab items 802 respectively in the display areas 902 of the predetermined tabs 901 of the tab display screen 900, the tab item displaying means 510 displays the tab display screen 900a after the arrangement, in a predetermined position on the touch panel 301 (near the lower side). Then, the tab item displaying means 510 notifies the condition screen displaying means 513 of this. The condition screen displaying means 513 having received the notice displays the setting condition screen associated with the specific tab item "simple setting" 802a (701a) on the touch panel 301 so as to be displayed in one screen together with the tab 901a which displays the tab-type status information (four gauges 800) (FIG. 6: S106). More specifically, first, the condition screen displaying means 513 refers to the setting condition table 801 stored in advance in the setting condition storing means 511. Next, the condition screen displaying means 513 cross-checks the specific tab item "simple setting" 802a and the tab items 802 of the setting condition table 801, and acquires setting condition information 803a (for example, setting item "paper selection" and initial setting item "automatic") associated with the cross-checked tab item "simple setting" 802a (701a). Next, the condition screen displaying means 513 refers to the image storing means 512, and acquires the setting condition screen associated with the specific tab item "simple setting" 802a from the setting condition screen (setting condition frame) prepared per tab item. Then, the condition screen displaying means 513 arranges (pastes) the acquired setting condition information 803a in a predetermined position in the acquired setting condition screen. The predetermined position is set in advance by users such as manufacturers. When the arrangement is finished, the condition screen displaying means 513 aligns the lower end of the setting condition screen after the arrangement is finished, to the upper end of the tab display screen 900a, and displays in one screen the tab 901a which displays the four gauges 800 among tabs 901 of the tab display screen 900a and the setting condition screen. By this means, the copy setting screen including the tab display screen and setting condition screen is displayed on the touch panel 301. In addition, when a tab display screen and setting condition screen are displayed in one screen, the tab and setting condition screen may be configured to be popped up (moved) in the forefront (frontmost layer of layers).

Figure 9F:
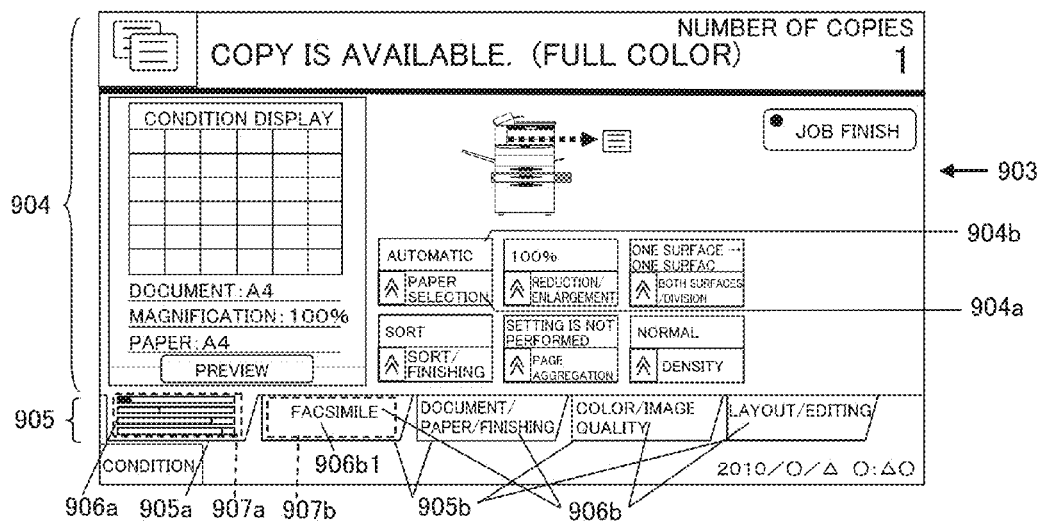
FIG. 9F is a diagram illustrating an example of a copy setting screen displayed on a touch panel according to Embodiment 1 of the present invention.

FIG. 9F is a diagram illustrating an example of the copy setting screen displayed on the touch panel according to Embodiment 1 of the present invention.

As illustrated in FIG. 9F, in the copy setting screen 903, the setting condition screen 904 in which the setting condition information 803a associated with the specific tab item "simple setting" 802a (for example, setting item "paper selection" 904a and initial setting item "automatic" 904b) is arranged in a predetermined position, and the tab display screen 905 (900a) in which the tab-type status information 906a (four gauges) is arranged in the display area of the specific tab 905a (tab positioned at the left end) and other tab items 906b (for example, "facsimile" 906b1) are arranged in the display area of the other tabs 905b other than the specific tab, are displayed.

Thus, by replacing the specific tab item "simple setting" 802a indicating the setting condition screen 904 which has already been displayed (specific tab item which is less necessary to display) with tab-type status information (four gauges) of the multi-functional printer 100 connected to the operation unit 103, it is possible to effectively utilize the tab display area 907a which displays a specific tab item, and notify in advance users of the state (status information) of the multi-functional printer 100 which is to be operated from now, via the tab display area 907a.

Here, when finishing displaying setting condition screen 904, the step returns to S101 and the condition screen displaying means 513 notifies the operation unit controlling means 502 of this. The operation unit controlling means 502 having received the notice decides whether or not the start key 305 is selected (pushed down), via the push-down detecting means 514 (FIG. 6: S101).

Here, if the user does not select the start key 305 (FIG. 6: S101 NO), the operation unit controlling means 502 further decides whether or not a predetermined tab (tab item or key) is selected, via the push-down detecting means 514 (FIG. 6: S102).

Further, if the user does not select a predetermined tab (FIG. 6: S102 NO), the operation unit controlling means 502 starts up a time (not illustrated) provided in advance (FIG. 6: S107), and starts measuring the time passed from the time when the copy setting screen 903 is displayed. Further, the operation unit controlling means 502 compares the measured time passed and setting time set in advance by the user (sleep standby period, standby period and sleep period, hereinafter sleep period), and starts deciding whether or not the time passed exceeds the setting time (FIG. 6: S108).

Here, if the time passed is yet to exceed the sleep period (FIG. 6: S108 NO), the step returns to S101 and the operation unit controlling means 502 monitors whether or not the user selects, for example, the start key 305 or specific tab key, via the push-down detecting means 514. Thus, the operation unit controlling means 502 stands by for a predetermined period until selection of a predetermined key is received from the user.

Further, if, before the time passed exceeds the sleep period (FIG. 6: S108 NO), the user does not select the start key 305 (FIG. 6: S101 NO) and selects a tab indicating a tab item other than "simple setting" 802a, that is, a tab item (for example "facsimile" 906b1) which is not associated with the setting condition screen 904, among a plurality of tabs 905a and 905b displayed in the copy setting screen 903 (FIG. 6: S102 YES), the following steps are executed.

That is, when the user selects a tab indicating the tab item "facsimile" 906b1 looking at the copy setting screen 903, the push-down detecting means 514 detects selection of the tab item "facsimile" 906b1, and notifies the operation unit controlling means 502 of this (FIG. 6: S102 YES). The operation unit controlling means 502 having received the notice commands the status information acquiring means 503 to acquire status information associated with the tab item "facsimile" 906*b*1. The status information acquiring means 503 having received the command acquires the acquisition target item "paper jam information of automatic document feeding apparatus" 702*b* associated with the tab item "facsimile 906*b*1 (701*b*), from the above acquiring target table 700. Then, the status information acquiring means 503 communicates with the multi-functional printer 100, refers to the document presence detecting means 515 which holds ON/OFF information showing whether or not there is document in a document conveying path, according to the acquired "paper jam information of automatic document feeding apparatus" 702*b* and acquires the ON/OFF information (FIG. 6: S103). Here, ON information shows that there is document, and OFF information shows that there is no document. The document presence detecting means 515 monitors the conveying path in which document of the image reading target is conveyed by the image reading means 516 described later, and holds one piece of ON/OFF information. With Embodiment 1 of the present invention, the status information acquiring means 503 acquires "OFF information" from the document presence detecting means 515.

When the status information acquiring means 503 finishes acquiring "OFF information," the status information converting means 508 then converts the "OFF information" acquired by the status information acquiring means 503 into tab-type status information (FIG. 6: S104). With the method of converting status information "OFF information," for example, the status information converting means 508 converts "OFF information" into "No," and then generates a text image "No JAM" connecting this "No" to "JAM" indicating "paper jam information of automatic document feeding apparatus" 702*b*. Next, the status information converting means 508 converts a text font and font size such that the text image "No JAM" fits in the tab dimensions "10 mm long and 20 mm wide" associated with the tab item "facsimile" 906*b*1.

When finishing conversion to tab-type status information, the tab item displaying means 510 displays the converted tab-type status information "No JAM" in the tab display area which has displayed the tab item "facsimile" 906*b*1 selected by the user in the tab display screen 905 (in FIG. 9F, the display area 905*b* of the second tab positioned to the right of the tab positioned at the left end). Further, the tab item displaying means 501 displays the associated "simple setting" 802*a*, in the tab display area (in FIG. 9F, the tab display area 907*a* positioned at the left end) which has displayed previous tab-type status information 906*a* (four gauges) (FIG. 6: S105).

In addition, if the tab display screen 905 has already been displayed on the touch panel 301, the tab item displaying means 510 does not need to acquire the tab display screen 905 again from the screen storing means 512, and may change (rearrange) "facsimile" 906*b*1 which becomes the specific tab items, into newly converted tab-type status information "No JAM" and change (rearrange) the previous tab-type status information 906*a* to "simple setting" 802*a* which has become another tab item.

Further, the condition screen displaying means 513 acquires the setting condition screen associated with "facsimile" 906*b*1 from the screen storing means 512, arranges setting condition information associated with "facsimile" 906*b*1 in the setting condition screen and switches the setting condition screen 904 (previous setting condition screen) associated with "simple setting" 802*a*, to the setting condition screen associated with "facsimile" 906*b*1. Furthermore, the condition screen displaying means 513 displays in one screen the tab 905*a* which displays "No JAM" in the tab display screen 905 and the setting condition screen (FIG. 6: S106). By this means, the facsimile setting screen including the tab display screen and setting condition screen is displayed on the touch panel 301.

Figure 10G:
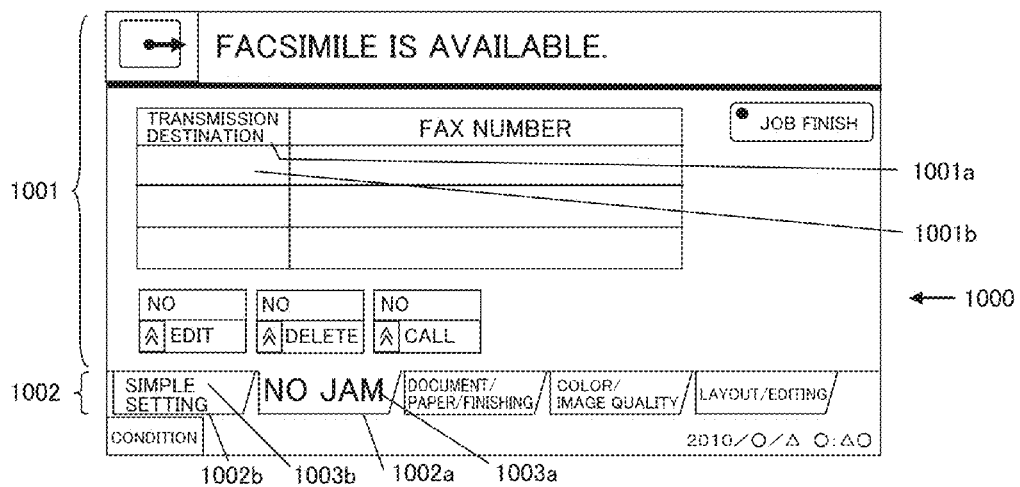
FIG. 10G is a diagram illustrating an example of a facsimile setting screen displayed on a touch panel according to Embodiment 1 of the present invention.

FIG. 10G is a diagram illustrating an example of the facsimile setting screen displayed on the touch panel according to Embodiment 1 of the present invention.

As illustrated in FIG. 10G, in the facsimile setting screen 1000, a setting condition screen 1001 in which setting condition information associated with "facsimile" 906*b*1 (for example, setting item "transmission item" 1001*a* and initial setting item "-" 1001*b*) is arranged in a predetermined position, is displayed. Further, in the facsimile setting screen 1000, the newly converted tab-type status information 1003*a* ("No JAM") is arranged in a tab display area 1002*a* which is scheduled to display "facsimile" 906*b*1, and the tab display screen 1002 in which "simple setting" 1003*b* is arranged in the tab display area 1002*b* which previously displayed the tab-type status information is displayed.

By this means, even if the user selects a tab indicating a desired tab item and, therefore, the previous setting condition screen 904 is switched to the setting condition screen 1001 associated with the tab item, the previous tab-type status information 906*a* is replaced with the tab item associated with the previous setting condition screen 904 and the selected specific item is replaced with new tab-type status information 1003*a*, so that the tab display screen 1002 is displayed at all times and, consequently, the user can always confirm tab-type status information (status information) of the multi-functional printer 100 related to the function which needs to be executed from now even during panel operations. Further, the display area which displays tab-type status information (status information) is the tab display area selected (pushed down) by the user immediately before, so that, combined with the original characteristics of tabs used for panel operation, the tab-type status information is more likely to catch users' attention and can adequately notify the users of status information.

Furthermore, if, before the time passed exceeds the sleep period (FIG. 6: S108 NO), the user selects the start key 305 looking at, for example, the copy setting screen 903 (or facsimile setting screen 1000) (FIG. 6: S101 YES), the following steps are executed. That is, when the user selects the start key 305 of the operation unit 103 in a state where the copy setting screen 903 is displayed on the touch panel 301, push-down detecting means 514 detects selection of the start key 305 and notifies the operation unit controlling means 502 of this (FIG. 6: S101 YES). The operation unit controlling means 502 having received the notice transmits the command to execute the copy function associated with the tab item "simple setting" 701*a*, to the image reading means 516 and function executing means 507 (FIG. 6: S109). The image reading means 516 having received the command reads an image of document based on the setting condition (including the initial condition) currently set, and stores the image in the image storing means 517 (FIG. 6: S110). Further, the function executing means 507 having received the command executes the copy function (image forming) based on the image stored in the image storing means 517 (FIG. 6: S110 YES). Here, before the start key 305 is selected, the user has confirmed tab-type status information 906*a* which is displayed in a specific tab display area 907a in the above copy setting screen 903 and which shows remaining toner information of each color, and therefore the user is prevented from selecting the start key 305 in a state (empty state) where, for example, predetermined toner used by the function executing means 507 runs out.

In addition, after one function is executed, the step returns to S101, and, for example, the user can also make the multi-functional printer 100 execute the facsimile transmission function or copy function via the facsimile setting screen 1000.

Further, if the user selects a predetermined setting item key in the setting condition screen looking at the copy setting screen 903 (or facsimile setting screen 1000), the following steps are executed. That is, when the user selects the setting item "paper selection" key 904a looking at the copy setting screen 903, the push-down detecting means 514 receives the setting item "paper selection" key 904a and notifies the operation unit controlling means 502 of this. The operation unit controlling means 502 having received the notice notifies the condition screen displaying means 513 of a command to display a plurality of selection items (for example, "A4" and "B4") associated with the setting item "paper selection" 904a, in the copy setting screen 903. The condition screen displaying means 513 having received the notice refers to selection item storing means (not illustrated), and acquires a plurality of selection items associated with the setting item "selection item" 904a, from the selection item storing means. Then, the condition screen displaying means 513 displays the acquired selection items selectably below the setting item "paper selection" 904a in the copy setting screen according to a pull-down menu format, and receives selection of a specific selection item from the user. When the user pushes down a predetermined selection item key, the operation unit controlling means 502 receives a predetermined selection item, that is, a setting condition, via the push-down detecting means 514.

Further, when, for example, the user moves away from the multi-functional printer 100 for urgent business after the copy setting screen 903 is displayed, that is, when the time passed exceeds the sleep period without a specific tab key nor setting item key (selection item key) being pushed down (FIG. 6: S101 NO→S102 NO→S108 YES), the following steps are executed. That is, when the time passed exceeds the sleep period, the operation unit controlling means 502 notifies the multi-functional printer controlling means 501 of the command of powering off (or transitioning to the sleep state). The multi-functional printer controlling means 501 having received the notice powers off the multi-functional printer 100 and operation unit 103 (or transition to the sleep state) (FIG. 6: S108 YES). By this means, it is possible to prevent unnecessary power consumption.

Function and Effect, Embodiment and Comparison Example Related to the Operation Unit 103 According to Embodiment 1 of the Present Invention Hereinafter, the function and effect of the multi-functional printer 100 according to Embodiment 1 of the present invention will be described.

Figure 10H:
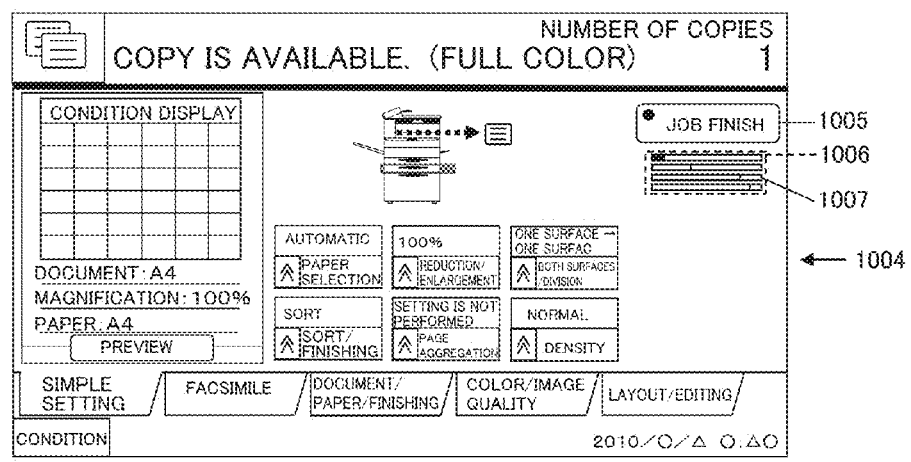
FIG. 10H is a diagram illustrating an example of a copy setting screen which displays tab-type status information in a display area in a setting condition screen according to Embodiment 1 of the present invention.

FIG. 10H is a diagram illustrating an example (comparison example) of a copy setting screen which displays tab-type status information in a display area in the setting condition screen according to Embodiment 1 of the present invention.

By asking a predetermined number of users (for example 10 people) to wait in front of the operation unit 103, the copy setting screen 1004 (hereinafter, comparison example screen) which displays tab-type status information 1007 (associated with the gauges 800 showing remaining toner of each color illustrated in FIG. 8C) in a predetermined display area (for example, the display area 1006 just below a job completion item 1005 indicating job completion illustrated in FIG. 10H) in the setting condition screen, is displayed on the touch panel 301 of the operation unit 103 for a predetermined period (for example, 10 seconds). After the waiting users check the copy setting screen 1004 only for the predetermined period, the users are asked to pick up a predetermined number of impressive (memorable) display items in the copy setting screen 1004. Then, display items which are common between users among the picked up display items are organized, and whether or not information related to the tab-type status information 1007, that is, remaining toner information of each color is picked up as a display item is confirmed. Then, although display items to be picked up are considered to change according to, for example, the copy setting screen 1004 dimensions, the setting condition screen dimensions, the job completion item 1005 dimensions, the tab-type status information 1007 dimensions and the display (arrangement) position, remaining toner information of each color, is hardly picked up as a display item. This may be construed that tab-type status information 1007 becomes indistinguishable from other setting condition information (for example, setting item "paper selection") in the setting condition screen and the other setting condition information is more likely to catch users' attention than the tab-type status information 1007, and therefore the tab-type status information 1007 is less impressive and therefore is not memorable for the users.

By contrast with this, instead of the comparison example screen 1004, by preparing the copy setting screen which displays the tab-type status information in the specific tab display area associated with the setting condition screen (for example, the copy setting screen 903 illustrated in FIG. 9F, hereinafter, embodiment screen), the users are asked as described above to pick up a predetermined number of impressive display items. Then, although the display items to be picked up are considered to change according to, for example, the tab display screen 905 dimensions, the tabs 905a and 905b dimensions, the tab-type status information 906a dimensions, information related to the tab-type status information 906a (remaining toner information of each color) is picked up more than the comparison example screen 1004. That is, a greater number of users recognize remaining toner information of each color. This may be construed that the tabs 905a and 905b are used for panel operations, and the users are more likely to direct their attention to the tabs 905a and 905b for switching the setting condition screen 904, and, as a result, the tab-type status information 906a is more impressive and memorable for the users.

Further, although a case has been described with Embodiment 1 of the present invention where one status information is associated with a specific tab item, that is, where one acquisition target information is stored for one tab item of the acquisition target table, there may be a plurality of pieces of status information associated with a specific tab item. That is, the operation apparatus according to the present invention can be configured such that, when there are a plurality of pieces of status information associated with a specific tab item, the status information acquiring means acquires a plurality of pieces of status information associated with a specific tab item, the status information converting means converts a plurality of pieces of status information into the tab-type status information per status information, and the tab item displaying means sequentially displays a plurality of pieces of tab-type status information for a predetermined period in a tab display area which displays the specific tab item, in a predetermined order per tab-type status information. With this configuration, a plurality of pieces of tab-type status information are switched and displayed per tab-type status information in a specific tab display area, so that it is possible to efficiently notify users of a specific tab item (function) and more pieces of status information related to the apparatus which is to be operated from now. In addition, the predetermined period is set to, for example, one second, two seconds or five seconds, and the predetermined order is set to the order of an earlier time when status information is acquired, or the order of higher emergency set in advance per status information by the user.

Further, although, with Embodiment 1 of the present invention, the status information converting means is configured to convert the four gauges into tab-type status information based on remaining toner information of each color and the tab dimension table, other configurations are possible. For example, a configuration is possible where, when there is toner indicated by remaining toner information that remaining toner is equal to or less than a predetermined threshold (20%) among remaining toner information of each color, the status information converting means converts a color of the toner (for example, black (K)) and remaining toner information (for example 10%) into tab-type status information (for example, "black 10%") showing them as texts (including numerical values). For example, when status information is converted into tab-type information including texts, the status information converting means adequately adjusts (changes) a text font and font size such that the information fits in the tab dimensions (tab display area).

Further, although, with Embodiment 1 of the present invention, tab-type status information is preferably a graphic image not including texts like the four gauges associated with remaining toner information of each color, a graphic image including part of texts (for example, a graphic image connecting type "A4" of paper and a graphic of paper), a graphic image designing texts as a graphic or an image including signs or texts may be possible. If an image including texts is "cassette B No A4 paper" showing remaining paper information, "A4" which is a main part of the remaining information may be extracted and connected to "Feed Paper!" indicating that paper needs to be fed to form a text image as tab-type status information. In addition, when the text image is tab-type status information, if the text image is configured to be decorated (such as bold-faced), the text image is more likely to catch more users' attention, and this is preferable.

Further, although, with Embodiment 1 of the present invention, the status information converting means is configured to convert the status information into tab-type status information based on the acquired status information and tab dimension table, other configuration are possible. For example, a configuration is possible where tab-type status information storing means (for example, tab-type status information conversion table) is prepared which stores in association status information and tab-type status information converted in advance to be displayed in the tab display area based on the status information and tab dimension table, and, when receiving the acquired status information, the status information converting means acquires tab-type status information associated with the status information from the tab-type status information storing means.

Figure 11I:
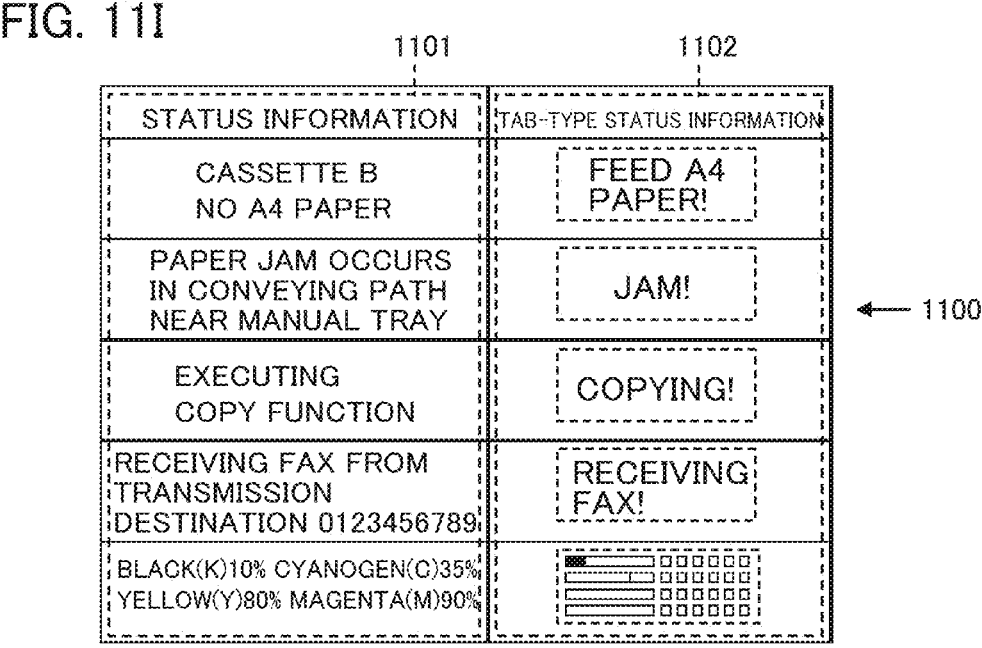
FIG. 11I is a diagram illustrating an example of a tab-type status information conversion table according to a modified example of Embodiment 1 of the present invention.

FIG. 11I is a diagram illustrating an example of a tab-type status information conversion table according to a modified example of Embodiment 1 of the present invention.

As illustrated in FIG. 11I, the tab-type status information conversion table 1110 stores in association status information 1101 acquired from the image forming apparatus and tab-type status information 1102 converted in advance to be displayed in the tab display area based on the status information and tab dimension table. With this configuration, the status information converting means may convert status information into tab-type status information using the tab-type status information conversion table 1100. In addition, if this configuration is employed, it is preferably to, for example, design the dimensions of the tab display area to be displayed in the tab display area uniformly for all tabs in order to display tab-type status information 1102 of the tab-type status information conversion table 1100 in the respective tab display areas. Further, for example, in case of tab-type status information in which a numerical value is reflected like remaining toner information of each color, it is preferable to design the numerical value in status information to change according to information in the tab-type status information (for example, remaining gauge position). Further, as illustrated in FIG. 11I, the four gauges associated with remaining toner information of each color may be configured to be partitioned, for example, in units of "10%" in the range between, for example, "100%" and "40%."

Furthermore, although, with Embodiment 1 of the present invention, status information is remaining toner information of each color, other status information is possible. For example, the status information may be, for example, remaining paper information of each size, error information showing an error (inconvenience) which has occurred in the multi-functional printer 100, or execution ongoing function information showing that the copy function is being executed by the function executing means. In addition, it is needless to say that, if status information is changed, the acquisition destination of status information acquired by the status information acquiring means is also changed. For example, if status information is remaining paper information of each size, the status information acquiring means acquires the remaining information from, for example, remaining paper storing means which stores remaining paper information of each size, and, if status information is error information, the status information acquiring means acquires each error information from, for example, the function executing means which holds error information, error detecting means which generates error information, paper jam detecting means which detects that paper is jamming in a paper conveying path (paper presence detecting means for a paper conveying path) and cassette attachment detecting means which detects that a paper feed cassette is not inserted to a predetermined attachment position. If status information is execution ongoing function information, the status information acquiring means acquires execution ongoing function information of each function from the function executing means which is executing a function.

Figure 11J:
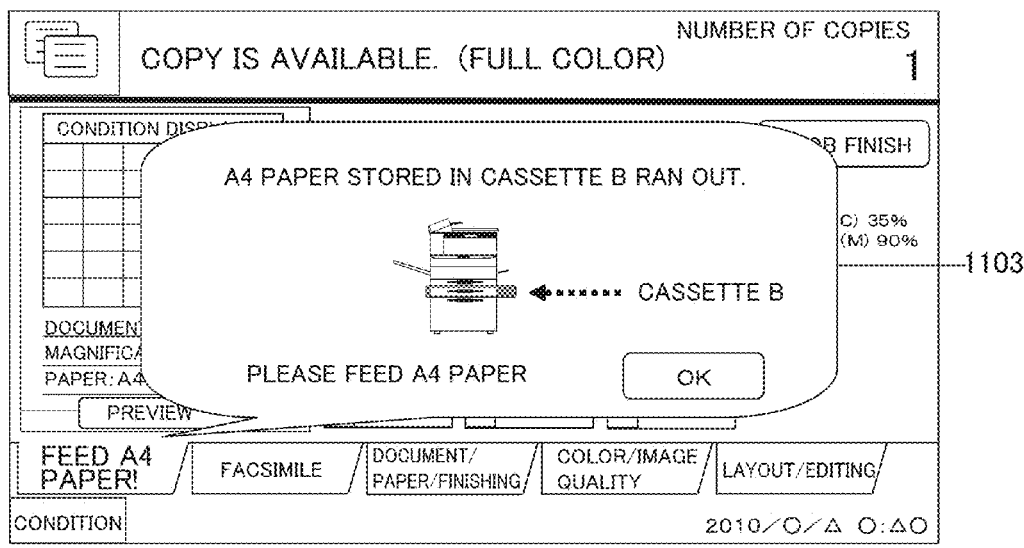
FIG. 11J is a diagram illustrating an example of a screen showing the details of status information according to a modified example of Embodiment 1 of the present invention.

Further, although, with Embodiment 1 of the present invention, the tab item displaying means is configured to simply display tab-type status information in a tab display area which displays a specific tab item, other configurations may be further added. For example, a configuration is possible where, when the user selects the display area of the tab (tab-type status information), the tab item displaying means (or condition screen displaying means) displays status information associated with the selected tab-type status information (or, for example, a screen showing the details of status information or a message associated with status information) on a setting condition screen according to a pop-up format. FIG. 11J is a diagram illustrating an example of a screen showing the details of status information according to a modified example of Embodiment 1 of the present invention. With this configuration, the users who show one's concern for tab-type status information can readily learn the details of status information via a screen 1103 showing the details of status information. In case of FIG. 11J, it is possible to urge the users to feed paper to a specific cassette.

Further, although the operation unit according to Embodiment 1 of the present invention is adopted for processing of a copy function (or facsimile transmission function) of the multi-functional printer, the operation unit may be adopted for a facsimile transmitting/receiving function, printing function, scan function, post-processing function or the like. Further, although a case has been described with Embodiment 1 of the present invention where the operation unit is applied to the multi-functional printer, the same function and effect can be provided even if the operation unit is applied to various image forming apparatuses, various electronic apparatuses or various measuring apparatuses having the operation unit (operation apparatus) including a touch panel. In addition, it is needless to say that, if the apparatus connected to the operation apparatus is changed, the acquisition target item, status information and tab-type status information are also changed. Further, although the operation unit according to Embodiment 1 of the present invention is adopted to the multi-functional printer which can execute a plurality of functions as a apparatus, the operation unit may also be connected and applied respectively to a plurality of apparatuses (for example, image forming apparatus, communication apparatus and storing apparatus) which each execute a single function.

Further, the operation unit according to Embodiment 1 of the present invention can be preferably adopted to an image forming apparatus (for example, multi-functional printer) which can execute a plurality of functions associated with tab items.

Further, although, with Embodiment 1 of the present invention, the operation unit is configured to have each means, a configuration to store a program which realizes each means in a storage medium and provide this storage medium is possible. With this configuration, the operation unit or multi-functional printer reads the program to realize each means. In this case, the program itself read from the storage medium can provide the function and effect of the present invention. Further, the program can also be provided as a method for storing in the hard disc the steps executed by each means.

Embodiment 2 of the Present Invention

Figure 12:
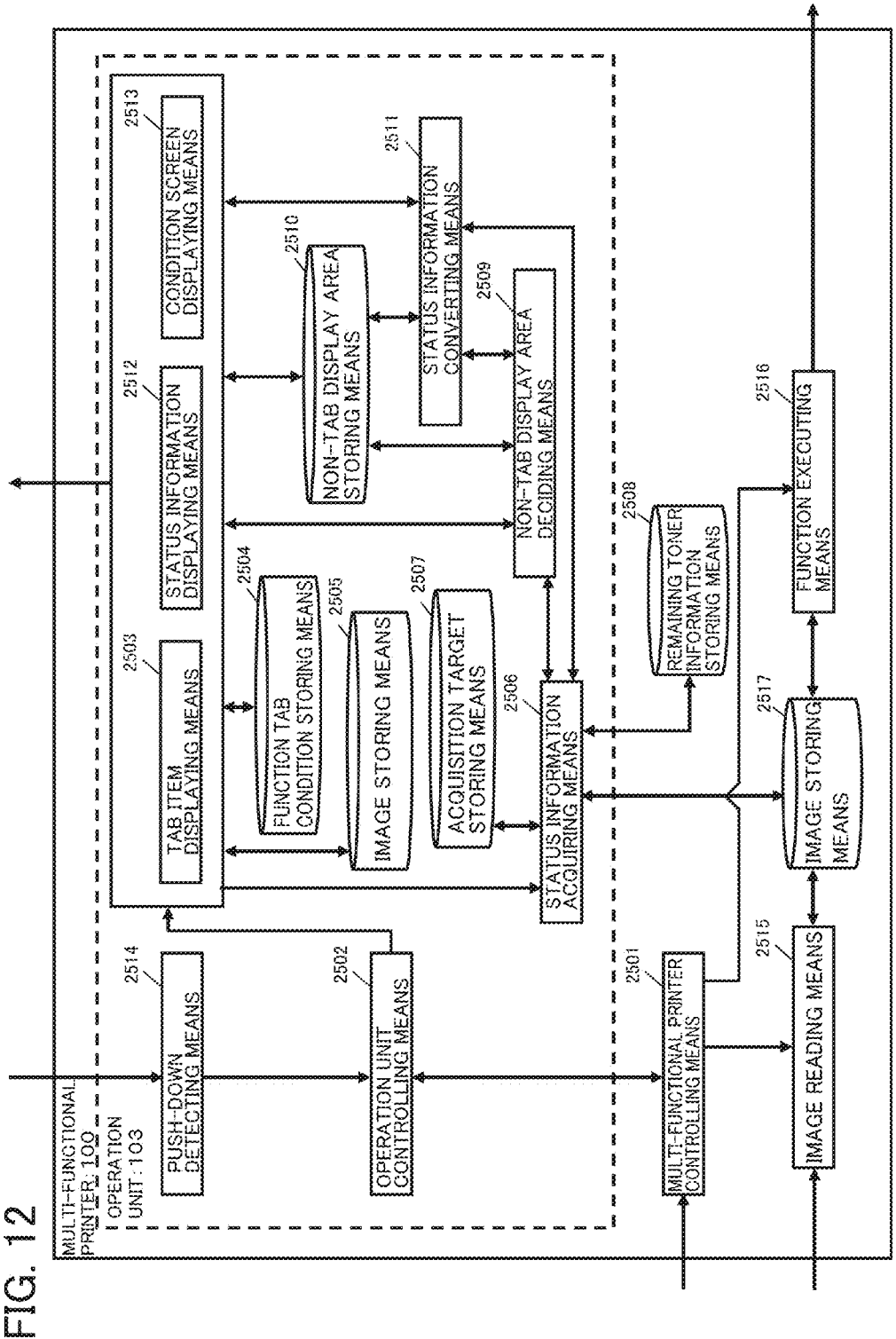
FIG. 12 is a functional block diagram of an operation unit and multi-functional printer according to Embodiment 2 of the present invention.
Figure 13:
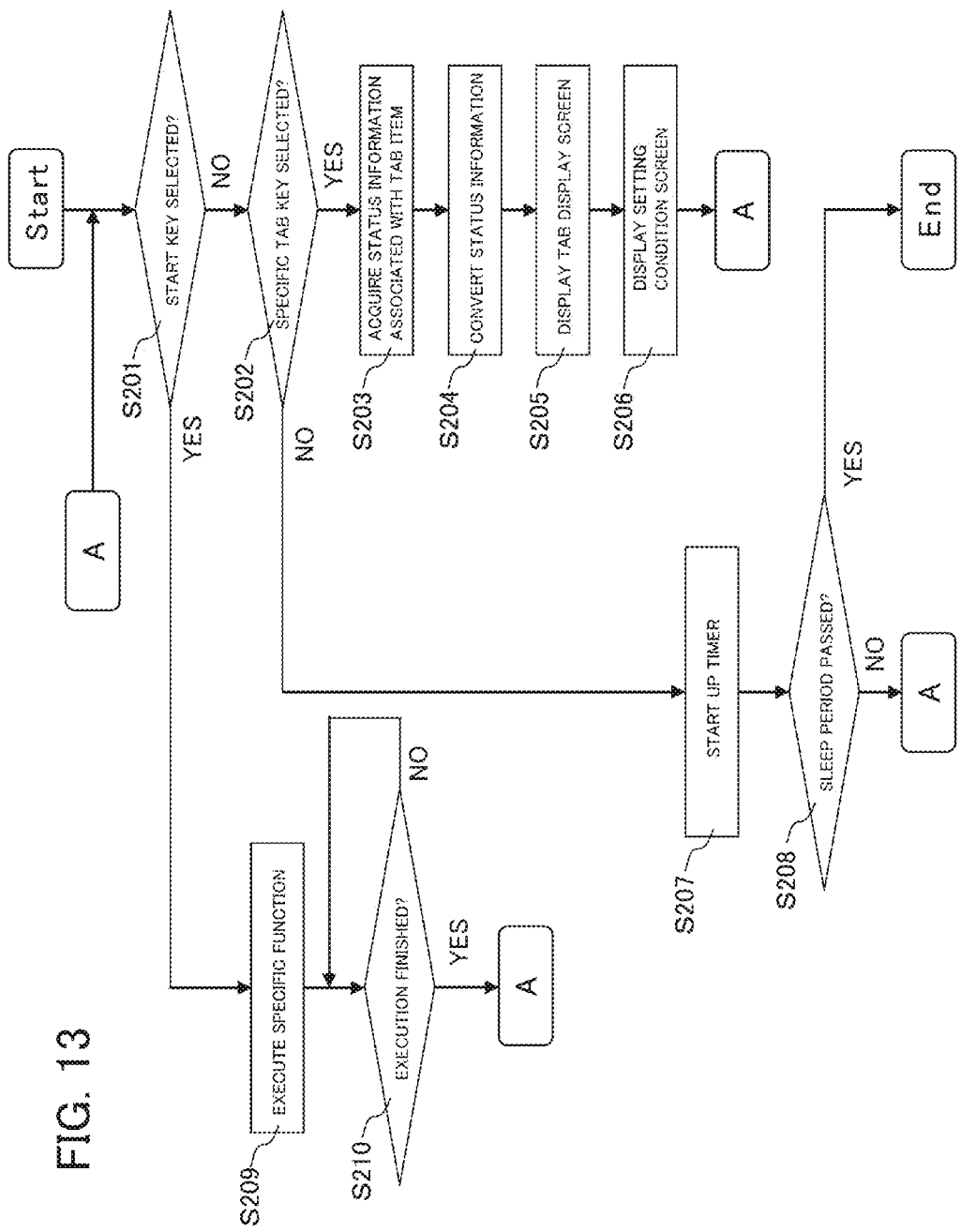
FIG. 13 is a flowchart illustrating execution steps according to Embodiment 2 of the present invention.

FIG. 12 is a functional block diagram of an operation unit and multi-functional printer according to Embodiment 2 of the present invention. FIG. 13 is a flowchart illustrating execution steps according to Embodiment 2 of the present invention. The configuration and execution steps of the present invention will be described in detail below.

First, when the user powers on the multi-functional printer 100, multi-functional printer controlling means 2501 of the multi-functional printer 100 and operation unit controlling means 2502 of the operation unit 103 connected to the multi-functional printer controlling means 2501 start up. The multi-functional printer controlling means 2501 commands the operation unit controlling means 2502 to display on the touch panel 301a copy setting screen which is initial setting screen (default setting screen) set in advance by the user and which is associated with the copy function.

The operation unit controlling means 2502 decides that the user has not yet selected (pushed down) the start key 305 (FIG. 13: S201 NO), further decides that a specific function (for example, copy function) is selected according to the command from the multi-functional printer controlling means 2501 (similar to when the user selects the "Copy" key 310a which is a hard key of the operation unit 103) (FIG. 13: S202 YES), and notifies the tab item displaying means 2503 of that the tab display screen associated with a specific function is displayed. The tab item displaying means 2503 having received the notice displays tab items in the number of tab display areas equivalent to the number of tab items associated with a specific function (FIG. 13: S203).

Although the method of the tab item displaying means 2503 to display associated tab items respectively in a predetermined number of display areas may be any method, the method is performed according to, for example, the following method. First, the tab item displaying means 2503 refers to a function tab condition table stored in advance in the function tab condition storing means 2504.

Figures 14A, 14B:
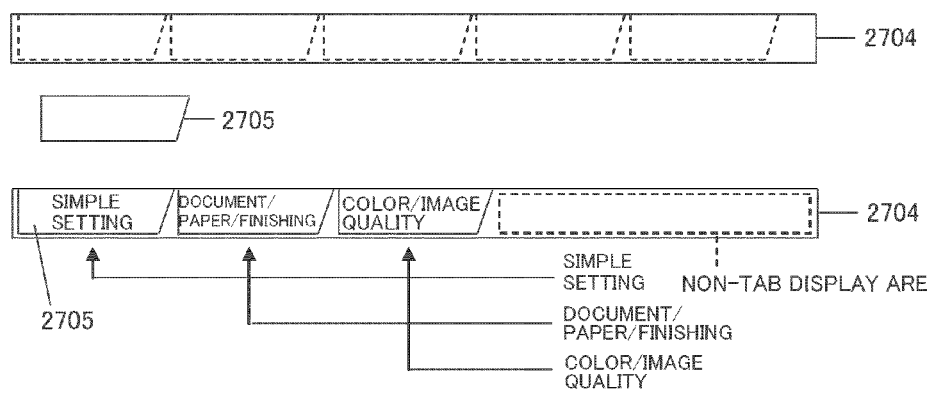
FIG. 14A is a diagram illustrating an example of a functional tab condition table according to Embodiment 2 of the present invention.
FIG. 14B is a diagram illustrating an example of a tab display screen and tabs according to Embodiment 2 of the present invention.

FIG. 14A is a diagram illustrating an example of a function tab condition table according to Embodiment 2 of the present invention.

As illustrated in FIG. 14A, the function tab condition table 2700 stores in association function items 2701 (for example, "copy" 2701a and "document box" 2701b) associated with functions which can be executed by the multi-functional printer 100 connected to the operation unit 103, a predetermined number of tab items 2702 (for example, "simple setting" 2702a) set in advance per function item 2701, and a predetermined number of pieces of setting condition information 2703 (for example, setting item 2703a and initial setting item 2703b) set in advance per tab item 2702.

When referring to the function tab condition table 2700, the tab item displaying means 2503 cross-checks the function items 2701 of the function tab condition table 2700 and the notified specific function "copy" ("copy function"), and acquires the tab item 2702 associated with the cross-checked function item "copy" 2701a from the uppermost stage of the function tab condition table 2700. From the function tab condition table 2700 illustrated in FIG. 14A, three tab items 2702 associated with the function item "copy" 2701a ("simple setting" 2702a, "document/paper/finishing" and "color/image quality") are all acquired.

Next, the tab item displaying means 2503 refers to the image storing means 2505, and acquires a tab display screen (tab display frame) stored in advance in the screen storing means 2505 and the tab (tab frame) displayed on the tab display screen.

FIG. 14B is a diagram illustrating an example of a tab display screen and tabs according to Embodiment 2 of the present invention.

As illustrated in FIG. 14B, the tab display screen 2704 is configured in a rectangular shape which is longer in left and right directions (horizontal direction) than up and down directions (vertical direction), and is configured to display all of a predetermined number (five at maximum) of tabs 2705. Further, the tab 2705 includes a display area which can display one tab item 2702. Furthermore, the tab 2705 is configured such that the size in the up and down directions is a predetermined size (for example, 1 mm) smaller than the size in the up and down directions of the tab display screen 2704 and the size in the left and right directions is the size about one fifth of the tab display screen 2704 size in the left and right directions, and is configured to fit in the tab display screen 2704. The number of tabs 2705 which can be displayed on the tab display screen 2704 matches the maximum number of tab items 2702 to each function item 2701 stored in the function tab condition table 2700.

When acquiring the tab display screen 2704 and tab 2705, the tab item displaying means 2503 counts the number of previously acquired tab items 2702, and duplicates a number of acquired tabs 2705 corresponding to the counted number (three). Further, the tab item displaying means 2503 aligns the duplicated tabs 2705 in series along the left end to the right direction such that the tabs do not overlap in the tab display screen 2704. Furthermore, the tab item displaying means 2503 respectively arranges (pastes) the tab items in the associated tab 2705 display areas, based on the alignment order of the tabs 2705 aligned in the tab display screen 2704 and the order of the tab items 2702 acquired from the function tab condition table 2700. For example, assuming that the tab item 2702 stored in the uppermost stage of the function tab condition table 2700 is the first and the tab 2705a positioned at the left end in the tab display screen 2704 is the first, in order to associate both of the tab items, the tab item displaying means 2503 pastes (arranges) the tab items 2702 acquired from the uppermost stage to the below, in the display areas of the tabs 2705 arranged from the left end to the right direction in the tab display screen 2704. After pasting of the tab items 2703 is finished, the tab item displaying means 2503 displays the tab display screen 2704 after pasting is finished, in a predetermined position (near the below) on the touch panel 301. As illustrated in FIG. 14B, in the tab display screen 2704 after displaying of the tab items 2702 is finished, there is a display area for two tabs and a display area (non-tab display areas) which does not display tab items (tabs).

In addition, when finishing displaying the tab item 2702, the tab item displaying means 2503 notifies the status information acquiring means 2506 of this. The status information acquiring means 2506 having received the notice acquires status information associated with the function item "copy" 2701a (specific function) from the multi-functional printer 100 (FIG. 13: S204).

Although the method of the status information acquiring means 2506 to acquire status information associated with the function item "copy" 2701a from the multi-functional printer 100 may be any method, the method is performed according to, for example, the following method. That is, the status information acquiring means 2506 having received the command refers to the acquisition target table stored in advance in the acquisition target storing means 2507.

FIG. 15C is a diagram illustrating an example of the acquisition target table according to Embodiment 2 of the present invention.

As illustrated in FIG. 15C, the acquisition target table 2800 stores in association function items 2801 (for example, "copy" 2801a) and status information 2802 (for example, "remaining toner information" 2802a) of the multi-functional printer 100 associated with functions when the multi-functional printer 100 executes the functions associated with the function items 2801. For example, if the function item 2801 is "copy" 2801a, "remaining toner information" 2802a of the multi-functional printer 100 associated with the copy function is stored in status information 2802. Further, if the function item 2801 is "document box" 2801b (associated with, for example, image data storing function and memory function), "remaining memory information" 2802b of the multi-functional printer 100 associated with the document box function is stored in status information 2802. In addition, although, with Embodiment 2 of the present invention, as illustrated in FIG. 15C, status information of the multi-functional item 2801 associated with the function shown by the function item 2801 is stored per function item, specific status information 2802 (for example, "remaining toner information" 2802a) may be uniformly stored in one function item 2801, or a plurality of pieces of status information 2802 may be stored in one function item 2801. The design of the acquisition target table 2800 is adequately changed by, for example, users.

The status information acquiring means 2506 cross-checks the specific function item "copy" 2701a and the function items 2801 of the acquisition target table 2800, and acquires status information "remaining toner information" 2802a associated with the cross-checked function item "copy" 2801a. Next, the status information acquiring means 2506 communicates with the multi-functional printer 100, refers to remaining toner information storing means 2508 which stores the remaining toner information and acquires remaining toner information of each color (for example, black (K) 10%, cyanogen (C) 35%, yellow (Y) 80% and magenta (M) 90%) from the remaining toner information storing means 2508.

In addition, remaining toner information of each color stored in the remaining toner information storing means 2508 is occasionally stored (updated) in the remaining toner information storing means 2508 every time, for example, the function executing means 2516 which will be described executes color printing using the remaining toner detecting means (not illustrated) which detects remaining toner information of each color.

When finishing acquiring remaining toner information of each color, the status information acquiring means 2506 notifies non-tab display area deciding means 2509 of this. The non-tab display area deciding means 2509 having received the notice decides whether or not there is a non-tab display area which does not display the tabs 2705 and in which status information "remaining toner information" 2802a can be displayed, in the tab display screen 2704, based on tab display screen identification information for identifying the tab display screen 2704 which displays the tab item 2702 and status information "remaining toner information" 2802a (FIG. 13: S205). In addition, here, although the definition of the non-tab display area is an area which does not display the tabs 2705 and which can display status information "remaining toner information" 2802a, the non-tab display area may be defined as an area which cannot display the tab items 2702 and which can display status information "remaining toner information" 2802a (described later).

Further, although the method of the non-tab display area deciding means 2509 to decide whether or not there is a non-tab display area in the tab display screen 2704 may be any method, the method is performed according to, for example, the following method. That is, the non-tab display area deciding means 2509 acquires information (hereinafter, tab display screen identification information, for example, the number of tabs "3") which enables identification of the tab display screen 2704 which displays a predetermined number tabs 2705 (or tab items 2702), from the tab item displaying means 2503, and status information (for example, "remaining toner information" 2802a) from the status information acquiring means 2506. Next, the non-tab display area deciding means 2509 refers to the non-tab display area table stored in advance in the non-tab display area storing means 2510.

FIG. 15D is a diagram illustrating an example of the non-tab display area table according to Embodiment 2 of the present invention.

As illustrated in FIG. 15D, the non-tab display area table 2803 stores in association tab display screen identification information 2804 (for example, the number of tabs "3" 2804*a*), status information 2805 (for example, "remaining toner information" 2805*a*) and presence/absence information 2806 showing presence or absence of the non-tab display area. Here, in presence/absence information 2806, if presence/absence information 2806 indicates that the non-tab display area is present, the non-tab display area size (for example, "40 mm (wide)×14 mm (long)" 2806*a*1) determined based on a tab display screen identification information 2804 and status information 2805 and position information of the non-tab display area (for example, "X (80-120), Y (15-29 2806*b*1)" are stored. In addition, with non-tab display area position information 2806*b*, original point 0 (0, 0) of the coordinate system of the touch panel 301 is set in advance at, for example, a lower left end part of the touch panel, and the range of the coordinate value when the up and down directions of the touch panel are the Y axis and the left and right directions are the X axis, is stored. Further, in presence/absence information 2806, if presence/absence information 2806 indicates that the non-tab display area is not present, "0" 2806*c* indicating that there is no no-tab display area is stored. The non-tab display area size 2806*a* and position information 2806*b* are determined by finding by the user in advance an area which cannot display tabs and which can display status information from the type of the status information, based on the tab display screen associated with the tab display screen identification information 2804 and the status information (for example, type). In addition, the same applies even to an area described later which cannot display tab items.

For example, if the tab display screen identification information 2804 is "3" 2804*a* and status information 2805 is "remaining toner information" 2805*a*, presence/absence information 2806 stores the non-tab display area size "40 mm (wide)×14 mm (long)" 2806*a*1 (size of about two tabs) and position information "X (80-120), Y (15 to 29)" 2806*b*1 (position of about two tabs near the right end of the tab display screen).

Further, if the tab display screen identification information 2804 is "4" 2804*b* and status information 2805 is "remaining memory information" 2805*b*, presence/absence information 2806 stores the non-tab display area size "20 mm (wide)×14 mm (long)" 2806*a*2 (size of about one tab) and position information "X (100-120), Y (15-29)" 2806*b*2 (position of about one tab near the right end of the tab display screen).

Furthermore, if tab display screen identification information 2804 is "5" 2804*c* and status information 2805 is "remaining memory information" 2805*b*, presence/absence information 2806 stores "0" 2806*c*. In addition, although not illustrated, if, for example, tab display screen identification information 2804 is "4" and status information 2805 is "remaining paper information," presence/absence information 2806 stores "0" 2806*c*. This is the case where, even if there is about one tab of the non-tab display area, remaining paper information becomes enormous according to, for example, the type of paper accommodated in a cassette, and therefore manufactures decide that the display area for one tab cannot display information and store "0" 2806*c* in presence/absence information 2806. Regarding these cases, design is adequately changed.

By designing in advance the non-tab display area table 2803 in this way, the non-display area deciding means 2509 can easily decide whether or not there is a non-tab display area, based on the tab display screen identification information (for example, the number of tabs), status information and non-tab display area table 2803, and smoothly advance conversion of status information described later and display of the converted tab-type status information when there is a non-tab display area.

Further, the non-tab display area deciding means 2509 cross-checks the non-tab display area table 2803, acquired tab display screen identification information "3" and status information "remaining toner information" 2802*a*, and refers to presence/absence information 2806 associated with the cross-checked tab display screen identification information 2804 and status information 2805. Furthermore, the non-tab display area deciding means 2509 decides whether or not there is a non-tab display area, based on the contents of the referred presence/absence information 2806 (FIG. 13: S205).

If there is a non-tab display area as a result of the decision, that is, if presence/absence information 2806 stores the non-tab display area size 2806*a* and position information 2806*b*, the non-tab display area deciding means 2509 decides that there is a non-tab area (FIG. 13: S205 YES), and notifies the status information converting means 2511 of this. The status information converting means 2511 having received the notice acquires the non-tab display area size 2806*a* (for example, "40 mm (wide)×14 mm (long)" 2806*a*1) in presence/absence information 2806 referred to by the non-tab display area deciding means 2509, and converts the status information into tab-type status information which can be displayed in the non-tab display area, based on the non-tab display area size 2806*a* and status information "remaining toner information" acquired by the status information acquiring means 2506 (FIG. 13: S206). In addition, a case where there is no non-tab display area will be described later.

Although the method of the status information converting means 2511 to convert status information into tab-type status information may be any method, the method is performed according to, for example, the following example.

Figure 16E:
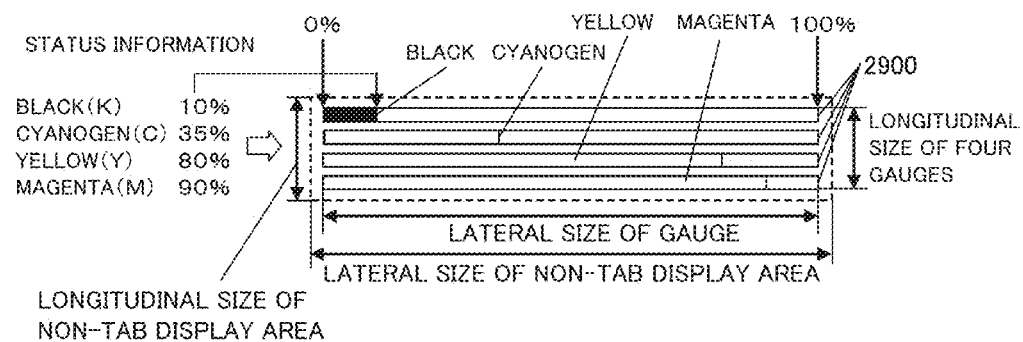
FIG. 16E is a diagram illustrating an example where remaining toner information of each color is converted into tab-type status information according to Embodiment 2 of the present invention.

FIG. 16E is a diagram illustrating an example where remaining toner information of each color is converted into tab-type status information according to Embodiment 2 of the present invention.

Although the converting method varies according to the type of status information, if, for example, status information is remaining toner information of each color, the status information converting means 2511 converts (defines as a graphic) remaining toner information of each color into the gauge of each color (four gauges) as a graphic image according to the non-tab display area size "40 mm (wide)×14 mm (long)" 2806*a*1. More specifically, the status information converting means 2511 generates four gauges 2900 having a lateral size (for example 38 mm) a predetermined size (for example, 2 mm) shorter than the lateral size (for example 40 mm) of the non-tab display area, and aligns the generated four gauges 2900 in parallel in a vertical direction at equal intervals (for example 1 mm). Next, the status information converting means 2511 adjusts the longitudinal size of each aligned gauge to a predetermined longitudinal size (for example, 2.5 mm) to make the size between the uppermost gauge and lowermost gauge (the longitudinal size of the entire graphic image formed with the four gauges 2900, and, for example, 13 mm in FIG. 16E) of the aligned four gauges 2900 a predetermined dimension (for example, 1 mm) shorter than a longitudinal size (for example, 14 mm) of the non-tab display area. Then, the status information converting means 2511 assigns remaining toner information of each color "black (K) 10%, cyanogen (C) 35%, yellow (Y) 80% and magenta (M) 90%" to the four gauges 2900 having the adjusted longitudinal sizes.

For example, if remaining toner information of black (K) is assigned to one gauge, the status information converting means 2511 specifies remaining toner position matching remaining toner information "10%" of black (K) assuming that the left end part of the gauge is "0" % and the right end part of the gauge is "100" %. If the lateral size of the gauge is, for example, 38.0 mm, the remaining toner position of black (K) is between the left end part "0" % (0.0 mm) and 0.10×38.0 mm=3.8 mm. Next, the status information converting means 2511 marks the left end part of the gauge "0 mm" to the remaining toner position "3.8 mm" with black (K) matching the color of toner. By this means, remaining toner information of black (K) is assigned to one gauge. In addition, the same applies to cyanogen (C), yellow (Y) and magenta (M). When the status information converting means 2511 assigns remaining toner information of each color to all gauges 2900, the assigned four gauges 2900 are aligned in parallel in order of black (K), cyanogen (C), yellow (Y) and magenta (M) from the top to the bottom and becomes a graphic image showing remaining toner of each color. Thus, by configuring remaining toner information of each color (status information) to be converted (defined as a graphic) into the four gauges 2900 (tab-type status information) which are graphic images not including texts, users can immediately recognize (confirm) remaining toner (status information) of each color by checking the images once, and this is preferable.

When finishing conversion to tab-type status information, the status information converting means 2511 notifies the status information displaying means 2512 of this. The status information displaying means 2512 having received the notice displays the converted tab-type status information in the non-tab display area in the tab display screen (FIG. 13: S207).

Although the method of the status information displaying means 2512 to display tab-type status information in non-tab display area may be any method, the method is performed according to, for example, the following method. That is, the status information displaying means 2512 acquires non-tab display area position information 2806*b* (for example, "X (80-120), Y (15-29)" 2806*b*1) in presence/absence information 2806 referred to by the non-tab display area deciding means 2509, specifies the non-tab display area position and displays the converted tab-type status information in a specified non-tab display area.

When finishing displaying tab-type status information on the non-tab display area, the status information displaying means 2512 notifies the condition screen displaying means 2513 of this. The condition screen displaying means 2513 having received the notice displays on the touch panel the setting condition screen associated with a specific tab among tabs displayed on the tab display screen 2704 (FIG. 13: S208). More specifically, the condition screen displaying means 2513 refers to the above function tab condition table 2700, specifies tab item set in advance among the tab items 2702 associated with the function item "copy" 2701*a* (for example, the tab item "simple setting" 2702*a* stored in the uppermost stage among the tab items of the function tab condition table 2700), and acquires all of a predetermined number of pieces of setting condition information 2703 associated with the specified tab item "simple setting" 2702*a*. Next, the condition screen displaying means 2513 refers to the above screen storing means 2505, and acquires a setting condition screen associated with a specific tab item "simple setting" 2702*a* among the setting condition screen (setting condition frame) prepared per tab item. Further, the condition screen displaying means 2513 arranges (pastes) the previously acquired setting condition information 2703 in a predetermined position in the acquired setting condition screen. The predetermined position is set in advance by users such as manufacturers. When the arrangement is finished, the condition screen displaying means 2513 aligns the lower end of the setting condition screen after the arrangement is finished, to the upper end of the tab display screen 2704, and displays in one screen the tab (tab positioned at the left end) which displays the specific tab item "simple setting" 2702*a* among tabs 2705 in the tab display screen and setting condition screen. By this means, the copy setting screen including the tab display screen and setting condition screen is displayed on the touch panel 301.

Figure 16F:
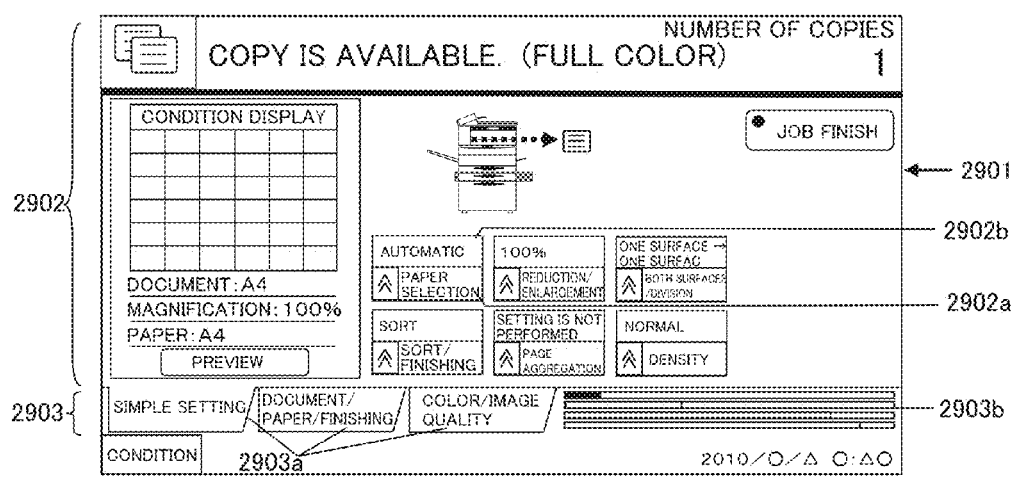
FIG. 16F is a diagram illustrating an example of a copy setting screen displayed on a touch panel according to Embodiment 2 of the present invention.

FIG. 16F is a diagram illustrating an example of a copy setting screen displayed on the touch panel according to Embodiment 2 of the present invention.

As illustrated in FIG. 16F, in the copy setting screen 2901, the setting condition screen 2902 in which setting condition information 2703 (for example, the setting item "paper selection" 2902*a* and initial setting item "automatic" 2902*b*) associated with the specific tab item "simple setting" 2702*a* is arranged in a predetermined position, and the tab display screen 2903 in which three tabs 2903*a* displaying three tab items respectively and tab-type status information 2903*b* are arranged in series toward the horizontal direction without overlapping each other, are displayed.

By this means, by displaying tab-type status information 2903*b* of the multi-functional printer 100 which can execute the function associated with the tab display screen 2903 (or setting condition screen 2902), in a non-tab display area which does not display the tab 2903*a* in the tab display screen 2903, the operation unit 103 can effectively utilize the non-tab display area. Further, the operation unit 103 can notify in advance users of the state (status information) of the multi-functional printer which is to be operated from now by displaying the tab-type status information.

By the way, if there is no non-tab display area as a result of the decision, that is, if presence/absence information 2806 stores "0" 2806*c* (FIG. 13: S205 NO), the non-tab display area deciding means 2509 notifies the condition screen displaying means 2513 of that there is no non-tab display area. The condition screen displaying means 2513 having received the notice displays the setting condition screen associated with the specific tab item "simple setting" 2702*a*, on the touch panel 301 as described above (FIG. 13: S208). Such a case where there is no non-tab display area corresponds to cases where, for example, the number of tabs associated with a specific function is great and therefore there is (generated) no non-tab display area in the tab display screen 2903 or cases where the amount of status information is too much and cannot be converted into the non-tab display area. In this case, the non-tab display area cannot be effectively utilized, and therefore status information needs not to be displayed.

Further, when finishing displaying the copy setting screen 2901, the step returns to S201 and the condition screen displaying means 2513 notifies the operation unit controlling means 2502 of this. The operation unit controlling means 2502 having received the notice decides whether or not the start key 305 is selected, via the push-down detecting means 2514 (FIG. 13: S201).

Here, when a user selects the start key 305, the following steps are executed. That is, when the user selects the start key 305 of the operation unit 103 in a state where the copy setting screen 2901 is displayed on the touch panel 301, the push-down detecting means 2514 detects selection of the start key 305 (FIG. 13: S201 YES) and notifies the operation unit controlling means 2502 of this. The operation unit controlling means 2502 having received the notice transmits the command to execute the copy function in association with the tab item "simple setting" 2702a, to the image reading means 2515 and function executing means 2516 (FIG. 13: S209). The image reading means 2515 having received the command reads an image of document based on a setting condition (including an initial condition) currently set in the tab item "simple setting" 2702a, and stores the image in the image storing means 2517. Further, the function executing means 2516 having received the command executes the copy function (image forming) based on the image stored in the image storing means 2517 (FIG. 13: S210). Here, before the start key 305 is selected, the user has confirmed tab-type status information 2903b showing remaining toner information of each color in the above copy setting screen 2901, and therefore the user is prevented from selecting the start key 305 in a state where, for example, predetermined toner used by the function executing means 2516 runs out (empty state). In addition, after the function is executed (FIG. 13: S210 YES), the step returns to S201, and additional selection of, for example, the start key 305 is received.

By contrast with this, if the operation unit controlling means 2502 decides that the start key 305 is not selected, the operation unit controlling means 2052 decides whether or not the hard key 310 (for example, the "Copy" key 310a or "Document Box" key 310b) provided in the operation unit 103 is selected (pushed down), via the push-down detecting means 2514 (FIG. 13: S202).

Here, if, for example, the user selects the "Document Box" key 310b among the hard keys 310 provided in the operation unit 103 looking at the copy setting screen 2901, the following steps are executed.

That is, when the user selects the "Document Box" key 310b, the push-down detecting means 2514 detects selection of the "Document Box" key 310b (FIG. 13: S202 YES) and notifies the operation unit controlling means 2502 of this. The operation unit controlling means 2502 having received the notice notifies the tab item displaying means 2503 of that the tab display screen associated with the specific function "document box" 310b is displayed. The tab item displaying means 2503 having received the notice acquires the tab item 2702 (for example, "custom box" 2702b) associated with the specific function "document box" 2701b, from the above function tab condition table 2700. Further, the tab item displaying means 2503 acquires tabs 2705 and the tab display screen 2704 which has not yet displayed tabs, from the screen storing means 2505. Furthermore, the tab item displaying means 2503 counts the number of the acquired tab items 2702, and aligns a number of tabs 2705 duplicated corresponding to the counted number (for example, four), in the tab display screen 2704. Still further, the tab item displaying means 2503 arranges the associated tab items 2702 in the display area of the tabs 2705 arranged in the tab display screen 2704, and displays the tab display screen 2704 after the arrangement, in the predetermined position on the touch panel 301 (FIG. 13: S203). The function item 2701 is "document box" 2701b this time, and the number of tabs 2705 associated with the number of tab items 2702 is four.

When the tab item displaying means 2503 finishes displaying the tab items 2702, the status information acquiring means 2506 then acquires status information "remaining memory information" 2802b associated with the specific function item "document box" 2801b from the above acquisition target table 2800. Further, the status information acquiring means 2506 communicates with the image storing means 2517 which holds remaining memory information in the multi-functional printer 100, and acquires remaining memory information showing an additional amount of image data which the image storing means 2517 can additionally store at the moment (FIG. 13: S204). Here, if, for example, all memory capacity provided in the image storing means 2517 is 100%, remaining memory information is information (for example, "remaining memory 30%") showing the rate of remaining memory capacity subtracting memory capacity of stored image data at the moment.

When the status information acquiring means 2506 finishes acquiring "remaining memory 30%," the non-tab display area deciding means 2509 then cross-checks the above non-tab display area table 2803, tab display screen identification information (the number of tabs "4") and status information ("remaining memory information" 2802b"), and refers to presence/absence information 2806 associated with the cross-checked tab display screen identification information 2804 and status information 2805. As illustrated in FIG. 15D, the referred presence/absence information 2806 stores the non-tab display area size "20 mm (wide)×14 mm (long)" 2806a2 and position information "X (100-120), Y (15-29)" 2806b2, and therefore the non-tab display area deciding means 2509 decides that there is a non-tab display area in the tab display screen 2704 (FIG. 13: S205 YES). The non-tab display area deciding means 2509 notifies the status information converting means 2511 of the decision result and, after receiving the notice, the status information converting means 2511 converts the "remaining memory 30%" into tab-type status information based on the non-tab display area size "20 mm (wide)×14 mm (long)" 2806a2 and status information "remaining memory 30%" (FIG. 13: S206).

With the method of converting status information "remaining memory 30%," for example, the status information converting means 2511 generates a text image "remaining memory 30%" by extracting "30%" which is a main part of the "remaining memory 30%" to "remaining memory" indicating "remaining memory information" and connecting "30%" to "remaining memory." Next, the status information converting means 2511 changes a text font and font size such that the text image "remaining memory 30%" fits in the non-tab display area size "20 mm (wide)×14 mm (long)" 2806a2.

When finishing conversion to tab-type status information, the status information displaying means 2512 displays the converted tab-type status information on the non-tab display area in the tab display screen 2704, utilizing the non-tab display area position information "X (100-120), Y (15-29)" 2806b2 (FIG. 13: S207). Further, the condition screen displaying means 2513 acquires setting condition information 2703 associated with "custom box" 2702b of "document box" 2701b, from the function tab condition table 2700. Furthermore, the condition screen displaying means 2513 acquires the setting condition screen associated with the "custom box" from the screen storing means 2505. Still further, the condition screen displaying means 2513 arranges the acquired setting condition information in a predetermined position on the setting condition screen, and switches the previous setting condition (setting condition screen 2902 associated with "simple setting" 2702a) to the setting condition screen associated with "custom box" 2702b. Still further, the condition screen displaying means 2513 displays in one screen the tab which displays the tab item "custom box" in the tab display screen 2704 and the setting condition screen (FIG. 13: S208). By this means, a document box setting screen including the tab display screen and setting condition screen is displayed on the touch panel 301.

Figure 17G:
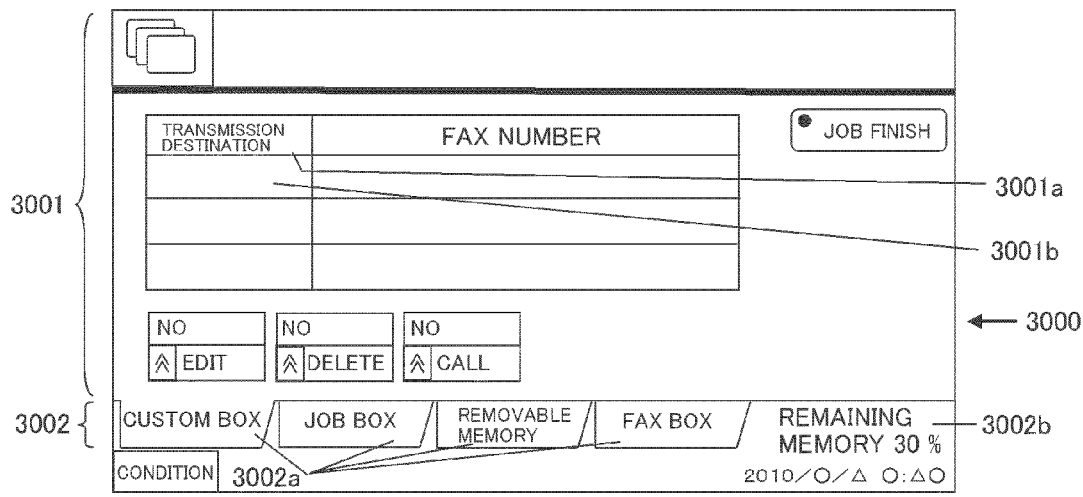
FIG. 17G is a diagram illustrating an example of a document box setting screen displayed on a touch panel according to Embodiment 2 of the present invention.

FIG. 17G is a diagram illustrating an example of the document box setting screen displayed on the touch panel according to Embodiment 2 of the present invention.

As illustrated in FIG. 17G, in a document box setting screen 3000, a setting condition screen 3001 in which setting condition information 2703 (for example, setting item "No" 3001a and initial setting item "-" 3001b) associated with the specific tab item "custom box" 2702b, and a tab display screen 3002 in which four tabs 3002a respectively displaying four tab items and tab-type status information 3002b are arranged in series toward the horizontal direction without overlapping each other, are displayed.

By this means, when the user selects the hard key 310 associated with the function which needs to be executed, even if the previously displayed copy setting screen 2901 is switched to the document box setting screen 3000 (tab display screen 3002 and setting condition screen 3001) associated with the hard key 310, tab-type status information 3002b associated with the selected function is displayed at all times in a non-tab display area which does not display tabs in the tab display screen 3002. Therefore, even during the panel operation, the user can always confirm tab-type status information 3002b (status information) of the multi-functional printer 100 related to the function which needs to be executed from now. Further, the non-tab display area which displays the tab-type status information 3002b is displayed near a tab 3002a without blocking display of the tab 3002a used for panel operations, so that, combined with the characteristics that the tab 3002a used for panel operations is more likely to catch users' attention, the tab-type status information 3002b is more likely to catch users' attention and adequately notify the users of status information.

In addition, when the document box setting screen 3000 is displayed on the touch panel 301, the step returns to S201, and the operation unit controlling means 2502 decides whether the start key 305 is pushed down (FIG. 13: S201) or the function key is pushed down (FIG. 13: S202).

By the way, if the user does not select, for example, the hard key 310 (FIG. 13: S202 NO), the following steps are executed. That is, the operation unit controlling means 2502 starts up the timer (not illustrated) provided in advance (FIG. 13: S211), and starts measuring the time passed from the time when the copy setting screen 2901 (or document box setting screen 3000) is displayed. Then, the operation unit controlling means 2502 compares the measured time passed and setting time set in advance by the user (sleep standby period, standby period or sleep period, hereinafter, sleep period), and starts deciding whether or not the time passed exceeds the sleep period (FIG. 13: S212).

Here, before the time passed exceeds the sleep period (FIG. 13: S212 NO), the step returns to S201 and the operation unit controlling means 2502 monitors whether or not the user selects the start key 305, specific hard key 310, or start key 305, via the push-down detecting means 2514. In this way, the operation unit controlling means 2502 stands by for a predetermined period until selection of a predetermined key is received from the user.

By contrast with this, if, for example, the user moves away from the multi-functional printer 100 for urgent business after the copy setting screen 2901 (or document box setting screen 3000) is displayed, that is, if the time passed exceeds the sleep period without the start key 305 nor specific hard key being pushed down (FIG. 13: S201 NO→S202 NO→S212 YES), the following steps are executed. That is, if the time passed exceeds th sleep period (FIG. 13: S212 YES), the operation unit controlling means 2502 notifies the multi-functional printer controlling means 2501 of a command of powering off (or transition to the sleep state). The multi-functional printer controlling means 2501 having received the notice powers off the operation unit 103 of the multi-functional printer 100 (transitions to the sleep state). By this means, it is possible to prevent unnecessary power consumption.

Function and Effect, Embodiment and Comparison According to Embodiment 2 of the Present Invention Here, the function and effect of the operation unit 103 according to Embodiment 2 of the present invention will be described.

Figure 17H:
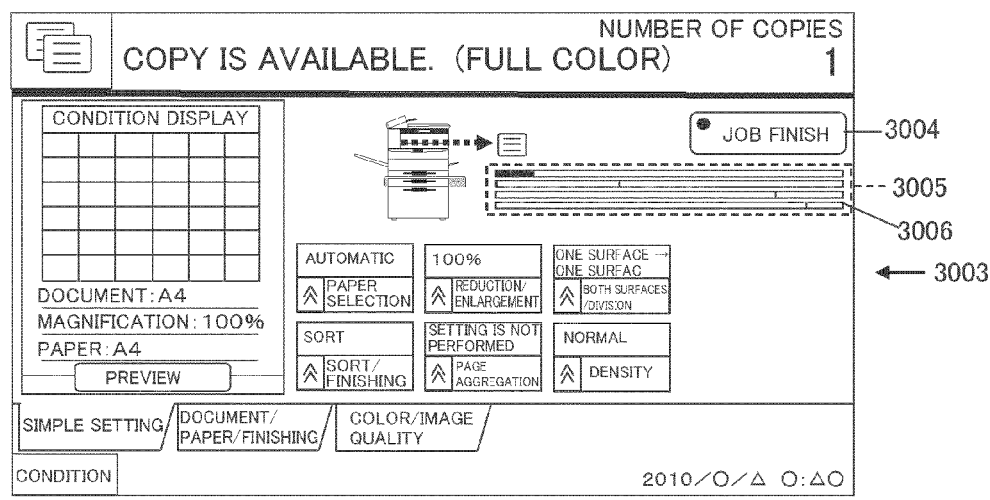
FIG. 17H is a diagram illustrating an example of a copy setting screen which displays tab-type status information in a predetermined display area in a setting condition screen according to Embodiment 2 of the present invention.

FIG. 17H is a diagram illustrating an example of a copy setting screen which displays tab-type status information in a predetermined display area in a setting condition screen according to Embodiment 2 of the present invention.

By asking a predetermined number of users (for example 10 people) to wait in front of the operation unit 103, a copy setting screen 3003 (hereinafter, comparison example screen) which displays tab-type status information 3006 (associated with the gauges 2903b showing remaining toner of each color illustrated in FIG. 16F) in a predetermined display area (for example, the display area 3005 just below a job completion item 3004 indicating job completion illustrated in FIG. 17H) in the setting condition screen is displayed on the touch panel 301 of the operation unit 103 for a predetermined period (for example, 10 seconds). After the waiting users check the copy setting screen 3003 only for the predetermined period, the users are asked to pick up a predetermined number of impressive (memorable) display items in the copy setting screen 3003. Then, display items which are common between users among the picked up display items are organized, and whether or not information related to the tab-type status information 3006, that is, remaining toner information of each color, is picked up as a display item is confirmed. Then, although display items to be picked up are considered to change according to the copy setting screen 3003 dimensions, the setting condition screen dimensions, the job completion item 3004 dimensions, the tab-type status information 3006 dimensions and the display (arrangement) position, remaining toner information of each color is hardly picked up as a display item. This may be construed that the tab-type status information 3006 becomes indistinguishable from other setting condition information (for example, setting item "paper selection") in the setting condition screen and the other setting condition information is more likely to catch users' attention than the tab-type status information 3006, and therefore the tab-type status information 3006 is less impressive and therefore is not memorable for the users.

By contrast with this, instead of the comparison example screen 3003, by preparing the copy setting screen which displays tab-type status information in the specific tab display area associated with the setting condition screen (for example, the copy setting screen 2901 illustrated in FIG.

16F, hereinafter, embodiment screen), the users are asked as described above to pick up a predetermined number of impressive display items. Then, although the display items to be picked up are considered to change according to, for example, the tab display screen 2903 dimensions, the tab 2903*a* size, the tab-type status information 2903*b* size, information related to the tab-type status information 2903*b* (remaining toner information of each color) is picked up more than the comparison example screen 3003. That is, a greater number of users recognize remaining toner information of each color. This may be construed that the tab 2903*a* is used for panel operations, and the users are more likely to direct their attention to the tab 2903*a* for switching the setting condition screen 2902, and, as a result, the tab-type status information 2903*b* displayed near the tab 2903*a* is more impressive and memorable for the users.

In addition, although, with Embodiment 2 of the present invention, the tab display screen identification information is set as the number of tabs, any information is possible as long as information enables identification of the display screen 2704 which displays a predetermined number of tabs. For example, the tab display screen identification information may be a function item defining a tab item, the number of tab items, tab item, a tab display screen size or a tab size.

Further, although, with Embodiment 2 of the present invention, non-tab display area deciding means is configured to decide whether or not there is a non-tab display, utilizing a non-tab display area table of the non-tab display area storing means, other configurations are possible. For example, the non-tab display area deciding means may be configured to extract an area (dimensions) which does not display tabs, from the tab display screen which displays a predetermined number of tabs, decide whether or not the status information can be displayed in the extracted area based on, for example, the extracted area and the type of the status information (single information like JAM information or a plurality of pieces of information like remaining toner information), and decide whether or not there is a non-tab display area as a result of decision.

Further, although a case has been described with Embodiment 2 of the present invention where one status information is associated with a specific function, that is, a case where one status information is stored for one function item of the acquisition target table, a case may be possible where a plurality of pieces of status information are associated with a specific function. That is, the operation apparatus according to the present invention can be configured such that, when a plurality of pieces of status information are associated with a specific function, the status information acquiring means acquires a plurality of pieces of status information, the status information converting means converts a plurality of pieces of status information into the tab-type status information per status information and the status information displaying means sequentially displays a plurality of pieces of tab-type status information in the non-tab display area for a predetermined period in a predetermined order per tab-type status information. With this configuration, a plurality of pieces of tab-type status information are switched and displayed per tab-type status information in a non-tab display area, so that it is possible to efficiently notify users of specific functions and more pieces of status information related to the apparatus which is to be operated from now. In addition, the predetermined period is set to, for example, one second, two seconds or five seconds, and the predetermined order is set to the order of an earlier time when status information is acquired or the order of higher emergency set in advance per status information by the user.

Further, although, with Embodiment 2 of the present invention, the status information converting means is configured to convert the four gauges into tab-type status information based on remaining toner information of each color and the non-tab display area size, other configurations are possible. For example, a configuration is possible where, when there is toner indicated by remaining toner information that remaining toner is equal to or less than a predetermined threshold (20%) of remaining toner information of each color, the status information converting means converts a color of the toner (for example, black (K)) and remaining toner information (for example 10%) into tab-type status information (for example, "black 10%") showing them as texts (including numerical values). For example, when status information is converted into tab-type information including texts, the status information converting means adequately adjusts (changes) a text font and font size such that the information fits in the non-tab area.

Further, although, with Embodiment 2 of the present invention, tab-type status information is preferably a graphic image not including texts like the four gauges associated with remaining toner information of each color, a graphic image including part of texts (for example, a graphic image connecting type "A4" of paper and a graphic of paper), a graphic image designing texts as a graphic or an image including signs or texts may be possible. If, for example, an image including texts is "cassette B No A4 paper" showing remaining paper information, "A4" which is a main part of the remaining information may be extracted and connected to "Feed Paper!" indicating that paper needs to be fed, to form a text image as tab-type status information. In addition, when the text image is used as tab-type status information, if the text image is configured to be decorated (such as bold-faced), the text image is more likely to catch more users' attention, and this is preferable.

Further, although, with Embodiment 2 of the present invention, the status information converting means is configured to convert the status information into tab-type status information based on the acquired status information and the non-tab display area size, other configuration are possible. For example, a configuration is possible where tab-type status information storing means (for example, tab-type status information conversion table) is prepared which stores in association a non-tab display area size, status information and tab-type status information converted in advance to be displayed in the non-tab display area based on the non-tab display area size and status information, and the status information converting means acquires tab-type status information based on the status information, the non-tab display area size, and tab-type status information.

Figure 18I:
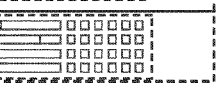
FIG. 18I is a diagram illustrating an example of a tab-type status information conversion table according to a modified example of Embodiment 2 of the present invention.

FIG. 18I is a diagram illustrating an example of a tab-type status information conversion table according to a modified example of Embodiment 2 of the present invention.

As illustrated in FIG. 18I, the tab-type status information conversion table 3100 stores in advance a non-tab display area size determined based on a predetermined tab display screen, the status information 3102 acquired from the image forming apparatus and the tab-type status information 3103 converted in advance to be displayed in the non-tab display area based on the non-tab display area size and the status information. With this configuration, the status information converting means may acquire tab-types status information associated with the non-tab type display area size and status information using the tab-type status information conversion table 3100. In addition, for example, in case of tab-type status information in which a numerical value is reflected like remaining toner information of each color, it is preferable to design the numerical value in status information to change according to information in the tab-type status information (for example, remaining gauge position). Further, as illustrated in FIG. 18I, the four gauges associated with remaining toner information of each color may be configured to be partitioned, for example, in units of "10%" in the range between, for example, "100%" and "40%."

Furthermore, with Embodiment 2 of the present invention, although status information is remaining toner information of each color, other status information is possible. For example, the status information may be, for example, remaining paper information of each size, error information showing an error (inconvenience) which has occurred in the multi-functional printer 100, execution ongoing function information showing that the copy function is being executed by the function executing means, paper jam information (JAM information) showing that paper is jamming in a document conveying path or conveying path of a copy target paper in an automatic document feeding apparatus and non-attachment information showing that the paper feed cassette is not yet attached to a predetermined attachment portion. In addition, it is needless to say that, if status information is changed, the acquisition destination of status information acquired by the status information acquiring means is also changed. For example, if status information is remaining paper information of each size, the status information acquiring means acquires the remaining information from, for example, remaining paper storing means which stores remaining paper information of each size, and, if status information is error information, the status information acquiring means acquires each error information from, for example, the function executing means which holds error information, error detecting means which generates error information, paper jam detecting means which detects that, for example, paper is jammed in a paper conveying path (paper present detecting means for a paper conveying path) and cassette attachment detecting means which detects that a paper feed cassette is not inserted to an attachment position. If status information is execution ongoing function information, the status information acquiring means acquires execution ongoing function information of each function from the function executing means which is executing a function.

Figure 18J:
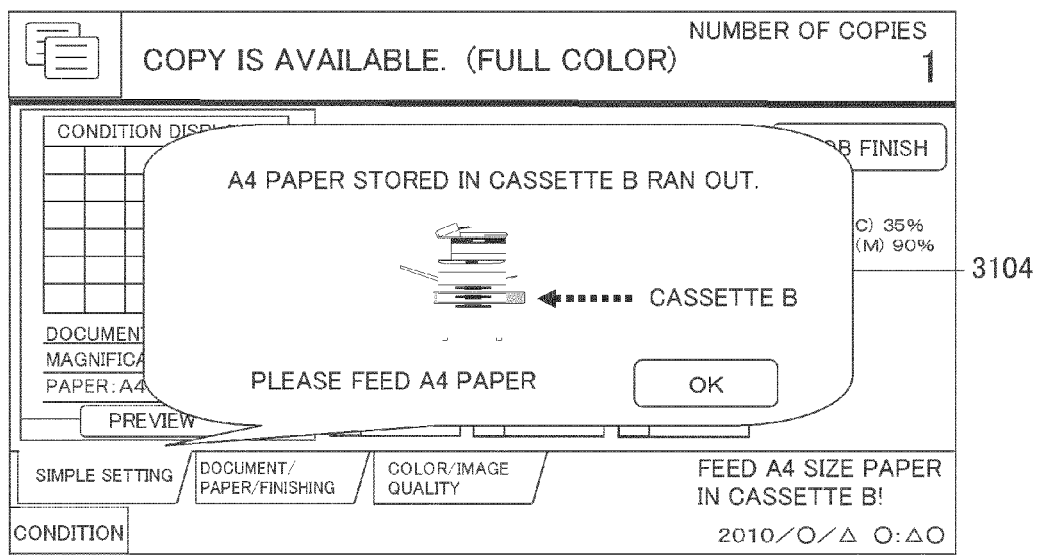
FIG. 18J is a diagram illustrating an example of a screen showing the details of status information according to a modified example of Embodiment 2 of the present invention.

Further, although, with Embodiment 2 of the present invention, the status information displaying means is configured to simply display tab-type status information in the non-tab display area, other configurations may be further added. For example, a configuration is possible where, when the user selects the non-tab display area (tab-type status information), the status information displaying means displays status information associated with the selected tab-type status information (or, for example, a screen showing the details of status information or a message associated with status information) on a setting condition screen according to a pop-up format. FIG. 18J is a diagram illustrating an example of a screen showing the details of status information according to a modified example of Embodiment 2 of the present invention. With this configuration, the users who show one's concern for tab-type status information can readily learn the details of status information via a screen 3104 showing the details of status information. In case of FIG. 18J, it is possible to urge the users to feed A4 size paper to a specific cassette.

Further, although, with Embodiment 2 of the present invention, a configuration is provided such that the non-tab display area deciding means decides whether or not there is one non-tab display area in the tab display screen, the status information converting means converts status information into one tab-type status information and the status information displaying means displays one tab-status information in one non-tab display area, this configuration may be changed according to the type of status information. For example, there are cases where, if status information is remaining toner information of each color, users can recognize this status information intuitively as remaining toner information based on color, and remaining toner information of one color can be displayed in a very small area (for example, the one tenth to one fiftieth of an area of the tab display screen) in the tab display screen according to a conversion mode. Such status information may be configured to display tab-type status information of each color converted from remaining toner information of each color, not only in one non-tab display area, but also in a plurality of non-tab display areas.

FIG. 19K is a diagram illustrating an example of the non-tab display area table according to a modified example of Embodiment 2 of the present invention.

As illustrated in FIG. 19K, the non-tab display area table according to a modified example stores in association the tab display screen identification information (for example, the number of tabs "5"), status information (for example, "remaining toner information") and presence/absence information 2806 showing whether or not there is a non-tab display area, and the presence/absence information stores the size of a non-tab display area which does not display tabs and position information of the non-tab display area near (near the right end part) one tab display area. In addition, in FIG. 19K, for ease of understanding, the non-tab display area size displays a right triangle associated with the non-tab display area, and position information of the non-tab display area displays the position of the non-tab display area associated with one tab by a dotted-line. When the number of tabs is "5" and status information is "remaining toner information," the non-tab display area deciding means decides that there is a non-tab display area based on the non-tab display area table according to a modified example, the status information converting means converts remaining toner information of each color into tab-type status information per each color based on the non-tab display area table such that remaining toner information fits in the non-tab display area size associated with the right triangle and the status information displaying means displays tab-type status information of each color in the corresponding non-tab display area of each color based on the non-tab display area table. By this means, even when the number of tabs is five and there is only a little non-tab display area (there are a plurality of little non-tab display areas) with respect to the entire display screen, if status information is "remaining toner information," it is possible to adequately display the status information on the tab display screen.

FIG. 19L1 is a diagram illustrating a first example of a tab display and tabs according to a modified example of Embodiment 2 of the present invention.

For example, the non-tag display area deciding means decides that, when the number of tabs is "5" and status information is "remaining toner information," there is a non-tab display area. Then, assuming that "black (K) 10%, cyanogen (C) 35%, yellow (Y) 80% and magenta (M) 90%" of "remaining toner information" is remaining toner information of each color "black (K) 10%," "cyanogen (C) 35%," "yellow (Y) 80%" and "magenta (M) 90%," the status information converting means converts remaining toner information of one color into tab-type status information based on the non-tab display area table such that remaining toner information fits in the non-display area size associated with the right triangle. Upon conversion, assuming that the lower end of the right triangle is "0%" and the upper end is "100%," a remaining toner position is specified from remaining toner information, and "0%" to the specified remaining position are marked with color of toner. By this means, remaining toner information of one color is converted into one tab-type status information. After the conversion is finished, the status information displaying means pastes the four pieces of converted tab-type status information in a right triangular non-tab display area of each tab (non-tab display area between tabs) in tab display screens in which five tabs and tab items associated with the tabs are respectively arranged based on the non-tab display area table. By this means, a plurality of pieces of tab-type status information are displayed in a plurality of non-tab display areas. In addition, the steps of the condition screen displaying means to display setting condition screens associated with specific items among tabs displayed on the tab display screen are the same as above.

Figure 20M:
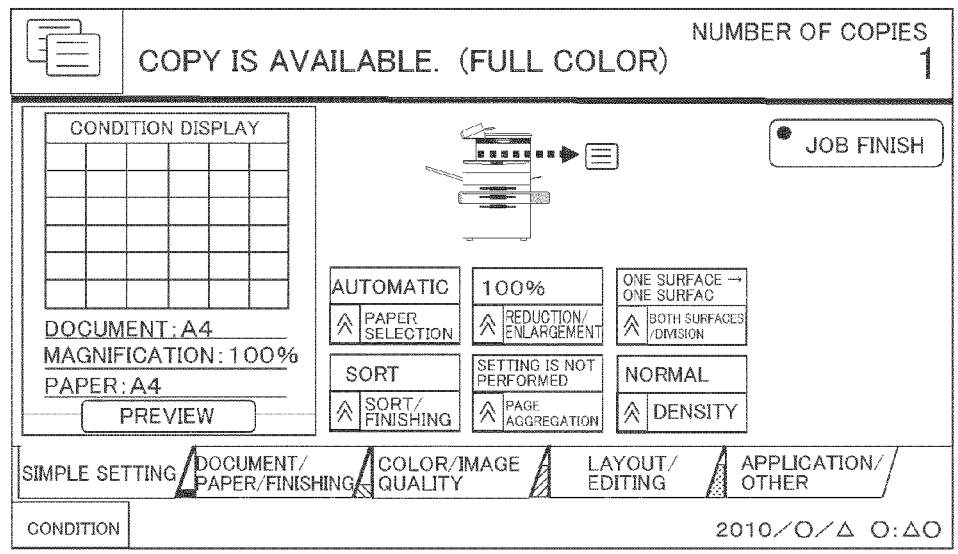
FIG. 20M is a diagram illustrating a first modified example of a copy setting screen displayed on a touch panel according to Embodiment 2 of the present invention.

FIG. 20M is a diagram illustrating a first modified example of the copy setting screen displayed on the touch panel according to Embodiment 2 of the present invention. As illustrated in FIG. 20M, even when the number of tabs is five and there is only a little non-tab display area with respect to the entire tab display screen, it is possible to adequately display status information "remaining toner information of each color" on the tab display screen and improve user friendliness.

Further, as a modified example of Embodiment 2 of the present invention, the definition of the non-tab display area may be configured to expand the non-tab display area to an area which does not display tab items and which can display status information, and display status information. That is, a configuration is possible where the non-tab display area deciding means decides whether or not there is a non-tab display area which does not display tab items and which can display status information, in the tab display screen, the status information converting means converts the status information into tab-type status information which can be displayed in the non-tab display area when there is a non-tab display area, and the status information displaying means displays the converted tab-type status information in the non-tab display area. With this configuration, even when the number of tabs is five and tab display areas occupy a large part of the entire tab display screen, the non-tab display area also includes an area which does not display a tab item in a display area in the tab, and the area near the tab item is more likely to catch user's attention like the area near the tab, so that, depending on the type of status information, it is possible to adequately display the status information in the tab display screen.

For example, as illustrated in FIG. 19K, the non-tab display area table according to a modified example stores in association the tab display screen identification information (for example, the number of tabs "5"), status information (for example, "remaining toner information") and presence/absence information showing whether or not there is a non-tab display area, and the presence/absence information stores the size of a non-tab display area which does not display tab items and position information of the non-tab display area in the display area for one tab. In FIG. 19K, for ease of understanding, the non-tab display area size displays a rectangle associated with the non-tab display area, and position information of the non-tab display area displays the position of the non-tab display area associated with one tab by a dotted-line. When the number of tabs is "5" and status information is "remaining toner information," the non-tab display area deciding means decides that there is a non-tab display area, based on the non-tab display area table according to a modified example, the status information converting means converts remaining toner information of each color into tab-type status information per each color based on the non-tab display area table such that remaining toner information fits in the non-tab display area size associated with the rectangle and the status information displaying means displays tab-type status information of each color in the corresponding non-tab display area of each color based on the non-tab display area table. By this means, even when the number of tabs is five and tab display areas occupy a large part of display areas of the entire tab display screen, an area which does not display tab items can be effectively utilized as a non-tab display area, so that, when, for example, status information is "remaining toner information," it is possible to adequately display the status information in the tab display screen.

FIG. 19L2 is a diagram illustrating a second example of a tab display screen and tabs according to a modified example according to Embodiment 2 of the present invention.

For example, the non-tag display area deciding means decides that, when the number of tabs is "5" and status information is "remaining toner information," there is a non-tab display area. Then, assuming that "black (K) 10%, cyanogen (C) 35%, yellow (Y) 80% and magenta (M) 90%" is remaining toner information of each color, the status information converting means converts remaining toner information of one color into tab-type status information based on the non-tab display area table such that remaining toner information fits in the non-display area size associated with the rectangle. Upon conversion, assuming that the lower end of the rectangle is "0%" and the upper end is "100%," a remaining toner position is specified from remaining toner information, and "0%" to the specified remaining position are marked with color of toner. By this means, remaining toner information of one color is converted into one tab-type status information. After the conversion is finished, the status information displaying means pastes the four pieces of converted tab-type status information in a rectangular non-tab display area of each tab (area which does not display tab items and which is near the left end part in tab display areas) in tab display screens in which five tabs and tab items associated with the tabs are respectively arranged based on the non-tab display area table. By this means, a plurality of pieces of tab-type status information are displayed in a plurality of non-tab display areas. In addition, the steps of the condition screen displaying means to display a setting condition screen associated with a specific tab among tabs displayed on the tab display screen are the same as above.

Figure 20N:
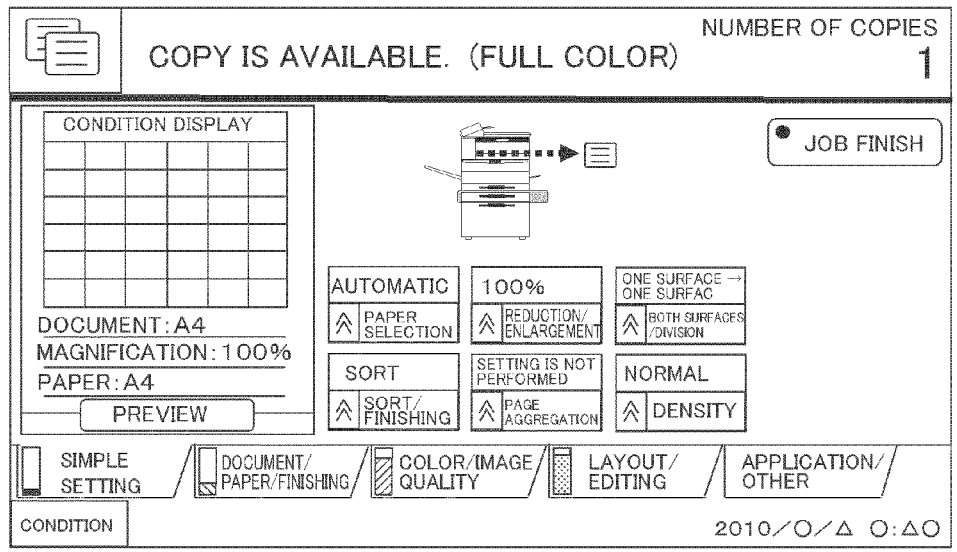
FIG. 20N is a diagram illustrating a second modified example of a copy setting screen displayed on the touch panel according to Embodiment 2 of the present invention.

FIG. 20N is a diagram illustrating a second modified example of the copy setting screen displayed on the touch panel according to Embodiment 2 of the present invention. As illustrated in FIG. 20N, even when the number of tabs is five and the tabs occupy a large part of display areas of the entire display screen, it is possible to adequately display the status information on the tab display screen by displaying tab-type status information in the area which does not display tab items, and improve user friendliness. In addition, although the non-tab display area position is an area near the left end part in the tab display area, other areas may be possible as long as the areas do not display tab items, and, for example, the non-tab display area size is a rectangle which is long in left and right directions and the non-tab display area position may be the area near the lower end part in the tab display area.

Further, although the operation unit according to Embodiment 2 of the present invention is adopted for processing of a copy function (or document box function) of the multi-functional printer, the operation unit may be adopted for a facsimile transmitting/receiving function, printing function, scan function or post-processing function and the like. Further, although a case has been described with Embodiment 2 of the present invention where the operation unit is applied to the multi-functional printer, the same function and effect can be provided even if the operation unit is applied to various image forming apparatuses, various electronic apparatuses or various measuring apparatuses having the operation unit (operation apparatus) including a touch panel. In addition, it is needless to say that, if the apparatus connected to the operation apparatus is changed, status information, presence/absence information of a non-tab display area, the non-tab display area size, position information, tab-type status information are also changed. Further, although the operation unit according to Embodiment 2 of the present invention is adopted to the multi-functional printer which can execute a plurality of functions as a apparatus, the operation unit may also be respectively connected and applied to a plurality of apparatuses (for example, image forming apparatus, communication apparatus and storing apparatus) which each execute a single function.

Further, the operation unit according to Embodiment 2 of the present invention can be preferably adopted to an image forming apparatus (for example, multi-functional printer) which can execute a plurality of functions associated with tab items.

Further, although, with Embodiment 2 of the present invention, the operation unit is configured to have each means, a configuration to store a program which realizes each means in a storage medium and provide this storage medium is possible. With this configuration, the operation unit or multi-functional printer reads the program to realize each means. In this case, the program read from the storage medium can provide the function and effect of the present invention. Further, the program can also be provided as a method for storing in the hard disc the steps executed by each means.

INDUSTRIAL APPLICABILITY

As described above, the operation apparatus and image forming apparatus having this operation apparatus according to the present invention is naturally useful for a multi-functional printer, and for a copier, printer and the like, and are effective as the operation apparatus and image forming apparatus having this operation apparatus which can adequately notify users of status information of apparatuses connected to the operation apparatus.

What is claimed is:

1. An operation apparatus configured to display a screen comprising a tab display screen and a setting condition screen on a touch panel, the tab display screen being configured to display a plurality of tabs associated with a function which is executable by a second apparatus connected to the operation apparatus, the setting condition screen being associated with a tab selected by a user from the plurality of tabs, the tab display screen and the setting condition screen being spatially separate from each other, and the tab display screen being set constant in size and fixed at a predetermined location with respect to the touch panel, the operation apparatus comprising:

a tab item display configured to display tab items respectively in tab display areas whose number corresponds to a number of the tab items associated with the function, the number of the tabs being variable according to the function, when the tab display screen associated with the function is displayed;

a control circuit configured to acquire status information of the second apparatus, which executes the function, from the second apparatus:

the control circuit further configured to decide whether or not there is a non-tab display area which is an area within the tab display screen, the non-tab display area displaying neither a tab nor a tab item and being configured to display the status information, based on the status information and information on identification of the tab display screen which displays a predetermined number of tabs;

the control circuit further configured to convert the status information into tab-type status information which is displayable in the non-tab display area, when the non-tab display area is present; and the control circuit further configured to display the tab-type status information thus converted in the non-tab display area, wherein the control circuit is further configured to store in association the information on identification of the tab display screen, the status information and presence/absence information showing presence or absence of the non-tab display area, wherein the control circuit is configured to determine whether or not the non-tab display area is present in the tab display screen, based on the information on identification of the tab display screen, the status information and the presence/absence information, wherein the presence/absence information comprises size and position information of the non-tab display area, and the non-tab display area is disposed between one tab and another tab adjacent to the one tab, and wherein the non-tab display area comprises a shape of a right triangle.

2. The operation apparatus according to claim 1, wherein:

when the non-tab display area is present, the control circuit is configured to convert the status information into the tab-type status information, based on the size of the non-tab display area and the status information; and the control circuit is configured to display the tab-type status information in the non-tab display area, based on the position information of the non-tab display area.

3. The operation apparatus according to claim 1, wherein:

when there are a plurality of pieces of status information associated with a function, the control circuit is configured to acquire the plurality of pieces of status information;

the control circuit is configured to convert the plurality of pieces of status information into the tab-type status information per status information; and the control circuit is configured to display the plurality of pieces of tab-type status information in the non-tab display area for a predetermined period in a predetermined order per tab-type status information.

4. The operation apparatus according to claim 1, wherein the tab-type status information comprises a graphic image of the status information.

5. An image forming apparatus comprising the operation apparatus according to claim 1, wherein the image forming apparatus executes the function.

\* \* \* \* \*